US00RE49911E

(19) United States
(12) Reissued Patent
Despain

(10) Patent Number: US RE49,911 E
(45) Date of Reissued Patent: Apr. 9, 2024

(54) MULTIPLE WIRE GUIDED SUBMISSILE TARGET ASSIGNMENT LOGIC

(71) Applicant: The Boeing Company, Chicago, IL (US)

(72) Inventor: Lewis Gail Despain, Federal Way, WA (US)

(73) Assignee: The Boeing Company, Chicago, IL (US)

(21) Appl. No.: 17/559,180

(22) Filed: Dec. 22, 2021

Related U.S. Patent Documents

Reissue of:
(64) Patent No.: 10,514,240
Issued: Dec. 24, 2019
Appl. No.: 06/308,021
Filed: Oct. 2, 1981

(51) Int. Cl.
*F42B 12/58* (2006.01)

(52) U.S. Cl.
CPC ..... *F42B 12/58* (2013.01)

(58) Field of Classification Search
CPC ..... F42B 12/58
USPC ..... 244/3.11, 3.12, 3.14; 102/384, 386, 387, 102/393, 394, 489
See application file for complete search history.

(56) References Cited

U.S. PATENT DOCUMENTS 3,478,212 A * 11/1969 Turck ..... F42B 12/387 250/351
3,974,740 A 8/1976 Billottet et al.
4,010,467 A 3/1977 Slivka
4,136,343 A 1/1979 Heffner et al.
4,143,836 A 3/1979 Rieger
4,185,796 A * 1/1980 Riley ..... F41G 7/32 244/3.12

(Continued)

FOREIGN PATENT DOCUMENTS

DE 2445478 4/1976
DE 2819938 11/1978

(Continued)

OTHER PUBLICATIONS

Brown, New Weapon Concepts Developed from Advanced Navigation Guidance and Targeting Technology, AGARD Conference Proceedings, No. 257 pp. 2-1-2-7 (May 1978).

*Primary Examiner* — William C Doerrler
(74) *Attorney, Agent, or Firm* — Yee & Associates, P.C.

(57) ABSTRACT

A missile system wherein a missile carrier delivers a plurality of submissiles over a target area. A passive or active scanner on the missile carrier repeatedly scans the target area as the missile carrier descends by drag brake over the target area. Submissile assignment to identified targets is performed at a selected altitude. A data processor controls the launching of the submissiles and actively guides the submissiles for substantial portions of their flights via optical fiber or wire links separately connecting each submissile to the missile carrier. Each submissile includes either passive or active identification devices enabling the data processor to track the submissiles individually. A missile assignment table stores a correspondence between identified targets and submissiles assigned thereto. Submissile assignment is effected on the basis of the strength of target signature. Alternatively, the most closely spaced group of targets equal in number to the number of submissiles will be assigned submissiles.

52 Claims, 19 Drawing Sheets

(56) References Cited

U.S. PATENT DOCUMENTS

| | | | | | |
|---|---|---|---|---|---|
| 4,247,059 | A | * | 1/1981 | Duke | F41G 7/30 244/3.12 |
| 4,274,609 | A | * | 6/1981 | Ferrier et al. | F41G 7/308 244/3.14 |
| 4,372,216 | A | * | 2/1983 | Pinson et al. | 102/489 |
| 4,625,646 | A | * | 12/1986 | Pinson | F42B 12/58 102/393 |

FOREIGN PATENT DOCUMENTS

| | | | | |
|---|---|---|---|---|
| FR | 2231947 | | 12/1974 | |
| FR | 2391908 | | 12/1977 | |
| FR | 2391908 | * | 1/1979 | 244/3.12 |

* cited by examiner

FIG. 10(a)

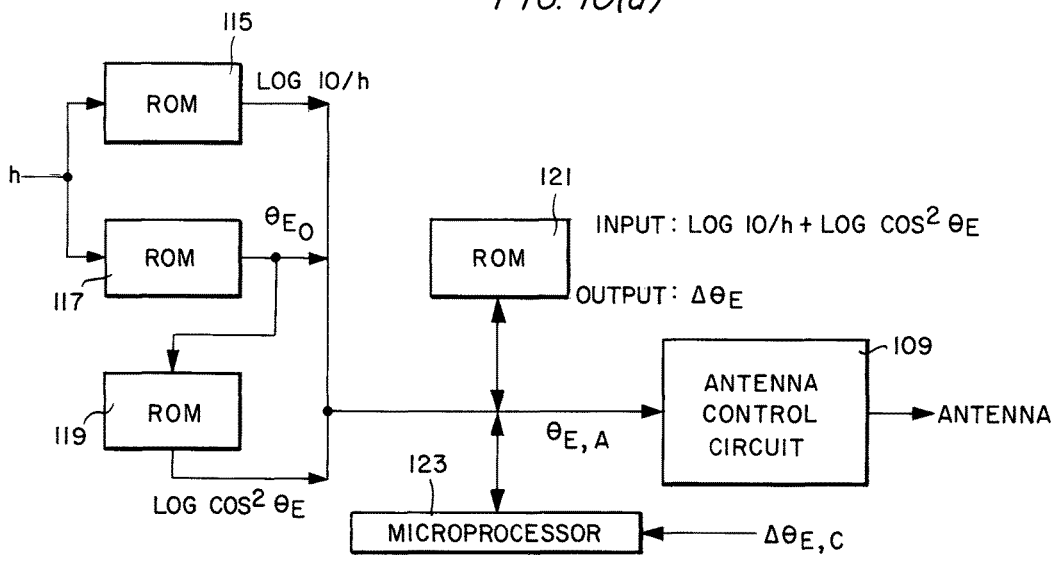

FIG. 10(b)

| | FUNCTION | INSTRUCTION | CYCLES |
|---|---|---|---|
| ONCE PER SLANT | INPUT $\Delta\theta_{E,C}$ | INPUT | 10 |
| | | MOVE A TO R1 | 4 |
| | INPUT ALTITUDE, h | INPUT | 10 |
| | | MOVE A TO R2 | 4 |
| | OUTPUT h TO $\theta_E$ ROM | OUTPUT | 10 |
| | READ $\theta_E$ | INPUT | 10 |
| | FIND $\theta_{E0}$ | SUB R1 FROM A | 4 |
| | | MOVE A TO R1 | 4 |
| | PUT h IN ACCUMULATOR | MOVE R2 TO A | 4 |
| | OUTPUT h TO LOG h ROM | OUTPUT | 10 |
| | READ LOG h | INPUT | 10 |
| | ADD LOG 500 | ADD MEM TO A | 7 |
| | STORE LOG h | STORE A DIRECT | 13 |
| ONCE PER IPP | PUT $\theta_E$ IN ACCUMULATOR | MOVE R1 TO A | 4 |
| | OUTPUT $\theta_E$ TO LOG $\cos^2$ ROM | OUTPUT | 10 |
| | READ LOG $\cos^2$ ROM | INPUT | 10 |
| | ADD LOG $\cos^2$ 45 DEG | ADD MEM TO A | 7 |
| | SUBTRACT LOG h | SUB MEM FROM A | 7 |
| | ADD LOG 10 | ADD MEM TO A | 7 |
| | OUTPUT A TO $\text{LOG}^{-1}$ | OUTPUT | 10 |
| | READ $-\Delta\theta_E$ | INPUT | 10 |
| | FIND NEW $\theta_E$ | ADD R1 TO A | 4 |
| | | MOVE A TO R1 | 4 |
| | SEND $\theta_E$ TO CONTROL | OUTPUT | 10 |
| | | | 183/83 |

FIG. 11(a)

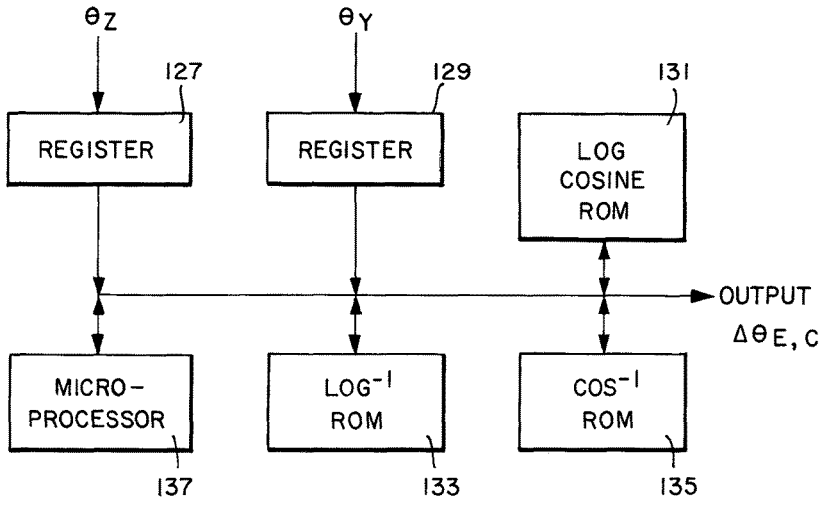

FIG. 11(b)

| FUNCTION | INSTRUCTION | CYCLES |
|---|---|---|
| READ $\theta_X$ | INPUT | 10 |
| OUTPUT TO LOG COS ROM | OUTPUT | 10 |
| READ LOG COS $\theta_X$ | INPUT | 10 |
| | MOVE A TO RI | 4 |
| READ $\theta_Y$ | INPUT | 10 |
| OUTPUT TO LOG COS ROM | OUTPUT | 10 |
| READ LOG COS $\theta_Y$ | INPUT | 10 |
| LOG COS $\theta_X$ + LOG COS $\theta_Y$ | ADD RI TO A | 4 |
| | MOVE A TO RI | 4 |
| GET LOG COS $\theta_F$ | LOAD A DIRECT | 13 |
| GET LOG COS $\theta_F'$ | SUBTRACT RI FROM A | 4 |
| OUTPUT TO $LOG^{-1}$ ROM | OUTPUT | 10 |
| READ COS $\theta_F'$ | INPUT | 10 |
| OUTPUT TO $COS^{-1}$ ROM | OUTPUT | 10 |
| READ $\theta_F'$ | INPUT | 10 |
| | MOVE A TO RI | 4 |
| GET $\theta_F$ | LOAD A DIRECT | 13 |
| GET $\Delta\theta_{E,C}$ | SUBTRACT RI FROM A | 4 |
| | OUTPUT | 13 |
| | | 163 |

AMPLITUDE

TIME

FIG. 18

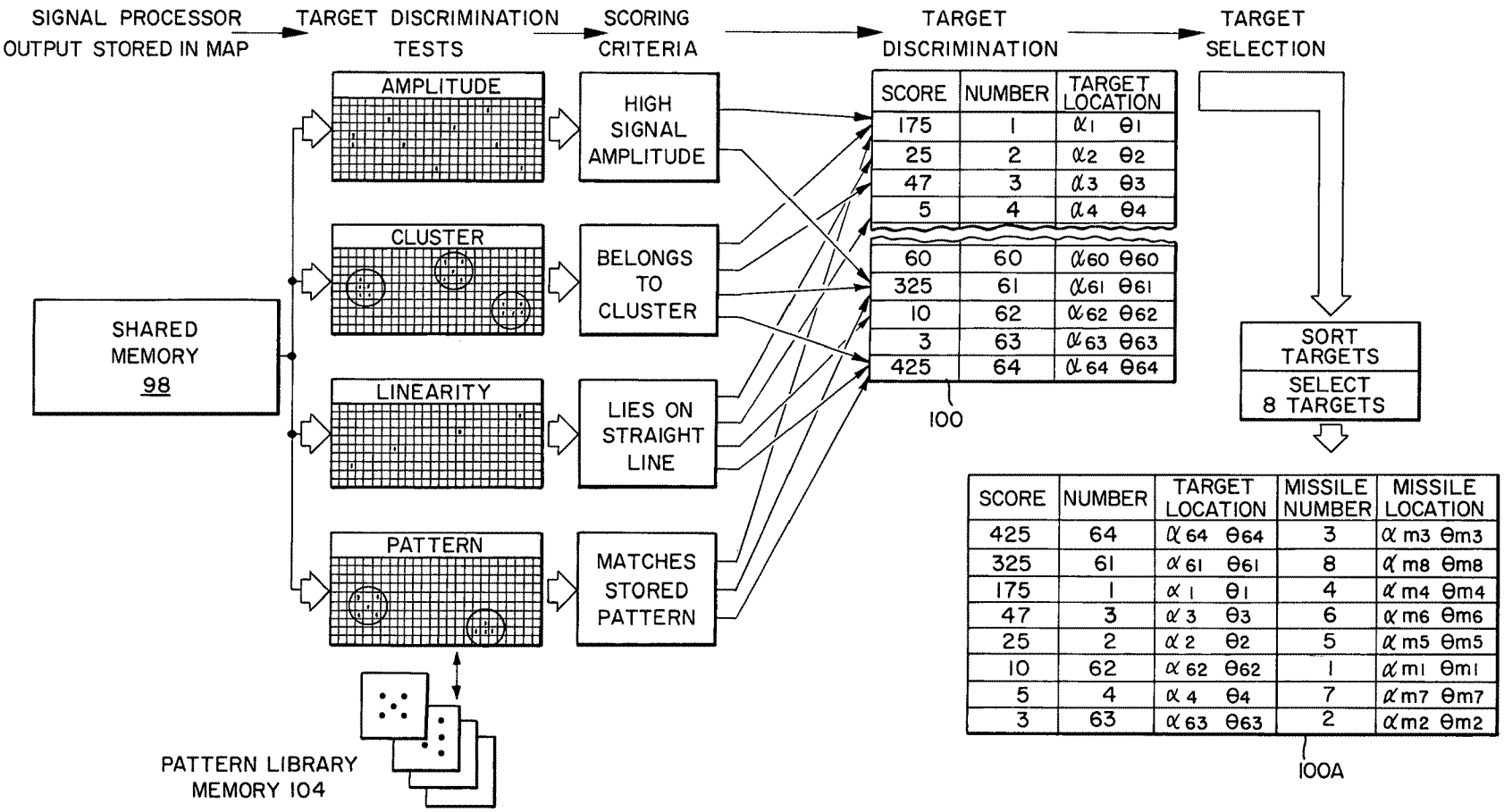

| SCORE | NUMBER | TARGET LOCATION |
|---|---|---|
| 175 | 1 | $\alpha_1$ $\theta_1$ |
| 25 | 2 | $\alpha_2$ $\theta_2$ |
| 47 | 3 | $\alpha_3$ $\theta_3$ |
| 5 | 4 | $\alpha_4$ $\theta_4$ |
| 60 | 60 | $\alpha_{60}$ $\theta_{60}$ |
| 325 | 61 | $\alpha_{61}$ $\theta_{61}$ |
| 10 | 62 | $\alpha_{62}$ $\theta_{62}$ |
| 3 | 63 | $\alpha_{63}$ $\theta_{63}$ |
| 425 | 64 | $\alpha_{64}$ $\theta_{64}$ |

| SCORE | NUMBER | TARGET LOCATION | MISSILE NUMBER | MISSILE LOCATION |
|---|---|---|---|---|
| 425 | 64 | $\alpha_{64}$ $\theta_{64}$ | 3 | $\alpha_{m3}$ $\theta_{m3}$ |
| 325 | 61 | $\alpha_{61}$ $\theta_{61}$ | 8 | $\alpha_{m8}$ $\theta_{m8}$ |
| 175 | 1 | $\alpha_1$ $\theta_1$ | 4 | $\alpha_{m4}$ $\theta_{m4}$ |
| 47 | 3 | $\alpha_3$ $\theta_3$ | 6 | $\alpha_{m6}$ $\theta_{m6}$ |
| 25 | 2 | $\alpha_2$ $\theta_2$ | 5 | $\alpha_{m5}$ $\theta_{m5}$ |
| 10 | 62 | $\alpha_{62}$ $\theta_{62}$ | 1 | $\alpha_{m1}$ $\theta_{m1}$ |
| 5 | 4 | $\alpha_4$ $\theta_4$ | 7 | $\alpha_{m7}$ $\theta_{m7}$ |
| 3 | 63 | $\alpha_{63}$ $\theta_{63}$ | 2 | $\alpha_{m2}$ $\theta_{m2}$ |

| SCORE | NUMBER | TIME | MISSILE |
|---|---|---|---|
| 175 | 1 ($\alpha_1$ $\theta_1$) | 10 | 8 |
| 25 | 2 ($\alpha_2$ $\theta_2$) | 14 | 1 |
| 47 | 3 ($\alpha_3$ $\theta_3$) | 47 | 2 |
| 5 | 4 ($\alpha_4$ $\theta_4$) | 63 | 3 |
| 60 | 5 ($\alpha_5$ $\theta_5$) | 70 | 4 |
| 325 | 6 ($\alpha_6$ $\theta_6$) | 77 | 5 |
| 10 | 7 ($\alpha_7$ $\theta_7$) | 89 | 6 |
| 3 | 8 ($\alpha_8$ $\theta_8$) | 110 | 7 |
| 425 | 9 ($\alpha_9$ $\theta_9$) | 165 | – |

FIG. 23

| TIME (SEC) | N (Gs) θ | | $V_M$ (FPS) | | Δ θ (DEGREES) | |
|---|---|---|---|---|---|---|
| | #1 | #2 | #1 | #2 | #1 | #2 |
| 1 | 2 | 1.7 | 300 | 300 | -36 | -25 |
| 2 | 2 | 1.7 | 320 | 325 | -19 | -12 |
| 3 | 2 | 1.7 | 345 | 355 | -10 | -5 |
| 4 | 2 | 1.7 | 370 | 385 | -4 | -1 |
| 5 | 2 | 0 | 395 | 420 | 0 | +1 |
| 6 | 0 | 0 | 420 | 420 | +1.5 | +1 |
| 7 | 0 | 0 | 420 | 420 | +2.5 | +1 |
| 8 | 0 | 0 | 420 | 420 | +2.5 | +1 |
| 9 | 0 | -- | 420 | -- | +1 | -- |
| 10 | 0 | -- | 420 | -- | 0 | -- |

MULTIPLE WIRE GUIDED SUBMISSILE TARGET ASSIGNMENT LOGIC

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates with particularity to a missile system wherein a main missile is delivered to a target area, scans the target area to identify targets therein, launches a plurality of submissiles, and guides the launched submissiles to strike the assigned targets.

BACKGROUND OF THE INVENTION

In recent years there has been much publicity and endorsement for a class of weapons generally known as smart weapons systems. These new weapons present a real potential for countering the numerical advantages of an enemy by utilizing advanced technological weapons which require little human intervention.

The smart weapons systems generally employ autonomous operations, e.g., missiles or submissiles, including an infrared, radar, or optical sensor, for scanning the targeted area of the missile or submissiles, and a data processor for analyzing the data acquired by the sensor and for directing appropriate munitions at specific targets. The data processor commonly includes digital circuitry for processing the data to identify and to select from surrounding background clutter one or more patterns or "signatures" corresponding to targets. In such smart weapons systems, each munition included therein is launched from a carrier, e.g., a main missile, helicopter, airplane, etc., which brings one or more of the munitions to a certain point with respect to the targets. In current systems, following launch from the carrier each of the munitions individually and independently searches for a target, acquires a target, and directs itself toward its acquired target.

The high cost of the carrier, especially when the carrier is a missile or a manned platform, has made it necessary to deliver a multitude of munitions over a target array for each carrier launched in order for the smart weapons system to be cost effective.

The carrier, whether it is a missile or an airplane, has specific payload limits including a specific volume available for storage of the munitions. When the munitions are submissiles, it is necessary that each of the submissiles be relatively small in diameter in order that they all fit within the carrier missile. Such constraint on the size of the submissiles necessarily restricts the amount of explosives carried thereby as well as the size of the sensor included in each submissile.

With regard to this last consideration, it is known that for any given wavelength, whether it be in the infrared or microwave spectrums, the basic quality of the data that a sensor is capable of acquiring is related to the square of the aperture size of the sensor. The ability to detect and to identify a target having a certain signature and located in a certain clutter environment, e.g., shrubs, rocks, trees, etc., is related to the resolution by which the target can be scanned by the sensor. For example, a 20 inch aperture microwave sensor will output data with a resolution 25 times better than a 4 inch aperture sensor at the same wavelength and the same level of data processing sophistication. To the extent that the data processor works with higher quality data, i.e., data having a higher signal to noise or signal to clutter ratio, the probability of acquiring, detecting, identifying, and designating an actual target is much greater.

Smart weapons systems heretofore known have been plagued with the problem of small sensor aperture and relatively poor quality target identification data because of the limitations on the aperture size of the sensors included in each munition or submissile. This has also limited the bad weather capabilities of the prior art systems because rain, fog, etc., further degrade the resolution with which small aperture sensors can scan a target area.

Smart weapons systems have also proven to be extremely expensive due partially to the requirement that a significant amount of advanced technology must be fabricated in a small package in order to fit the data processor, sensor, submissile guidance circuitry, and munitions into the small volume available in each submissile. This requires a high degree of custom integrated circuitry for performing the data processing requirements at a high rate. The greater the sophistication of such circuitry the more susceptible the system is to breakdown and the higher the system cost.

Another drawback of presently available smart weapons systems arises from the autonomous operation of the submissiles following launch. If a carrier releases a plurality of submissiles in the area of a target, there is no means for preventing each of the submissiles from identifying and selecting the same target, e.g., the target with the strongest signature, while ignoring other targets in the same general area which might have only slightly less prominent signatures. This result wastes the advantage of launching a plurality of submissiles at one time and may nullify the effectiveness of the weapons by leaving the majority of possible targets unscathed.

The net result is that smart weapons systems have heretofore been plagued with problems that have yet to be overcome, including very high cost, inherent unreliability because of high complexity, and prohibitively high developmental costs. Finally, since each individual submissile is smart, the expense of the missile system is greatly exacerbated by the need to duplicate costly sensors and data processor circuitry in each submissile.

OBJECTS AND SUMMARY OF THE INVENTION

It is, therefore, an object of the present invention to increase the quality of target data available for target selection processing by a missile system.

Another object of this invention is to prevent the unintentional assignment of multiple missiles to a single target.

Yet another object of this invention is to minimize the cost of a missile system including a main missile and a plurality of submissiles.

Still another object of this invention is to increase the bad weather capability of a missile system.

Another object of this invention is to provide a missile system wherein a main missile carrier identifies and selects a group of targets, assigns submissiles carried thereby to the selected targets, launches the assigned submissiles, and guides the launched submissiles to the assigned targets for a substantial portion of their flights.

Another object of this invention is to provide unambiguous and countermeasure resistant links between the main missile and the submissiles for purposes of communications, guidance, command and control, i.e., wire or optical fiber links.

These and other objects are accomplished by a missile system comprising a missile carrier deliverable to a position overlying a target area, a plurality of missiles carried by the missile carrier, the missile carrier including means for locating targets within the target area as the missile carrier descends toward the target area, means for determining the most closely spaced subset of the identified targets equal in number to the plurality of missiles carried by the missile carrier, means for individually assigning the missiles to each of the targets in the subset in a manner to minimize the likelihood of the trajectories of the missiles interfering with each other, means for launching the missiles against the assigned targets, and means responsive to the launching of the missiles for guiding the launched missiles substantially through the entire flights thereof from the missile carrier to the assigned targets as the missile carrier continues to descend toward the target area.

The accompanying drawings which are incorporated in and constitute a part of the specification, illustrate an embodiment of the invention and, together with the description, serve to explain the principles of the invention.

BRIEF DESCRIPTION OF THE DRAWINGS

FIG. 10(a) schematically illustrates a means for generating antenna control signals for the radar antenna used in the missile system of the instant invention.

FIG. 10(b) is a set of program instructions used by the microprocessor of FIG. 10(a) to generate the control signals for the radar antenna of the missile system of the instant invention.

FIG. 11(a) is a block diagram illustrating a means for compensating for the rotation of the main missile of the missile system of the instant invention about its Y and Z axes.

FIG. 11(b) is an example of a program for use by the microprocessor of FIG. 11(a) to compensate for the rotation of the main missile about its Y and Z axes.

FIG. 18 schematically illustrates an embodiment of target discrimination tests performed on the information stored in the shared memory of the missile system of the instant invention in order to identify probable targets within the target area.

FIG. 23 is a a tabular illustration of the commands during the initial predictive guidance phase as the submissiles are being "gathered" into the beams containing the assigned targets and the bias angle against which correction commands are transmitted during the final command guidance phase.

DETAILED DESCRIPTION OF THE PREFERRED EMBODIMENT

1. Overview of the Missile System

Figure 1:
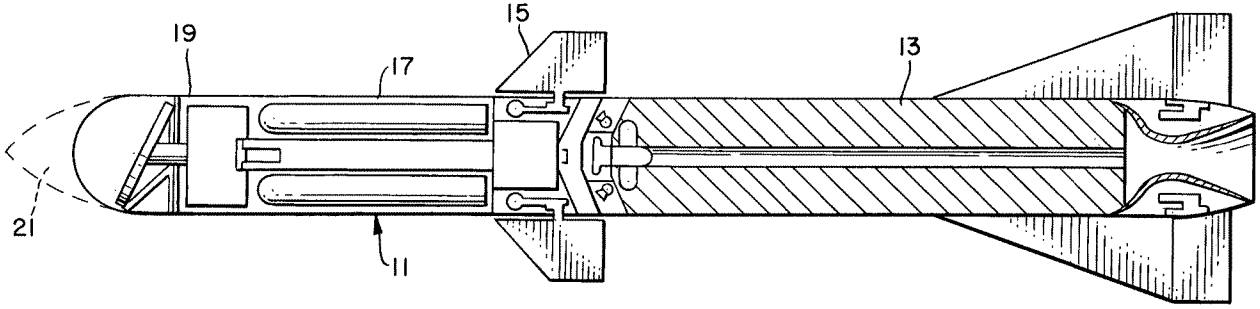
FIG. 1 is a cross section of a main missile utilized in the missile system of the instant invention.

FIG. 1 is a cross-sectional view of a main missile 11 as used in the missile system of the instant invention. The missile comprises a booster rocket 13, a guidance control section 15, a submissile launcher section 17, and a radar and data processing section 19. A removable nose cone 21 (shown by dashed lines) covers and protects the radar and data processing section 19 during the launching and initial flight of the main missile 11.

A suitable main missile 11 and booster rocket 13, as illustrated in FIG. 1, are together approximately 16-20 feet in length and 16-22 inches in diameter.

In order to avoid the target identification problems common to prior art smart weapons systems, the primary target sensing means for the instant missile system is provided in the main missile 11 and not in the individual submissiles carried in the submissile launcher section 17.

As embodied herein, the primary target sensing means comprises a large aperture radar unit 19 for the combined roles of target detection, designation, tracking, and submissile tracking and guidance. In accordance with the missile system of the instant invention, the submissiles to be launched by the submissile launcher 17 need not include individual flight path or target sensors. Instead, in the embodiment illustrated in FIG. 1, the sensor for guidance of all of the submissiles is the radar unit 19. The radar unit 19 may include up to a 20 inch aperture antenna which is easily accommodated by the 22 inch diameter booster rocket 13.

The large aperture sensor provides target and other data of a much higher degree of resolution than smaller aperture radars to enable greater target discrimination and more accurate guidance of the submissiles. The use of a single large aperture sensor not only provides higher data quality but also avoids replication of the cost of smaller aperture sensors required when the submissiles individually perform autonomous target identification and selection as in the smart weapons systems of the prior art.

Figure 2:
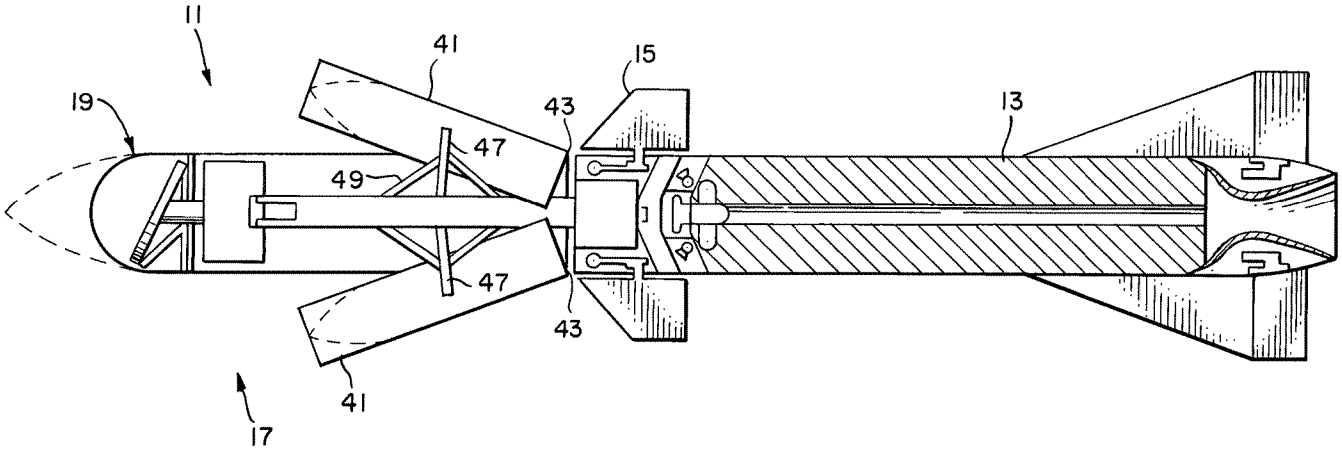
FIG. 2 is a cross section of the main missile of FIG. 1 with the submissiles extended into launch positions.

FIG. 2 illustrates in some detail the main missile 11 with submissiles 31 extended into firing positions. The submissile launcher section 17 includes one or more launching members 41, such as tubes, connected by pivots 43 at one end to a frame portion of the submissile launcher section 17 of the main missile 11.

Positioning means are provided for each submissile launching member 41 to extend the launching member into the launching position, i.e., angularly with respect to the vertical axis of the descending main missile 11. As embodied herein, the positioning means comprises one or more positioner arms 47 connected to extension arms 49. The extension arms 49 are attached to means for extending and retracting the submissile launching members from the submissile launcher section 17 of the main missile 11. The extending and retracting means comprises, for example, a hydraulic ram or a spring loaded actuator (not shown).

2. Missile System Applications and Attack Sequences

Figure 3:
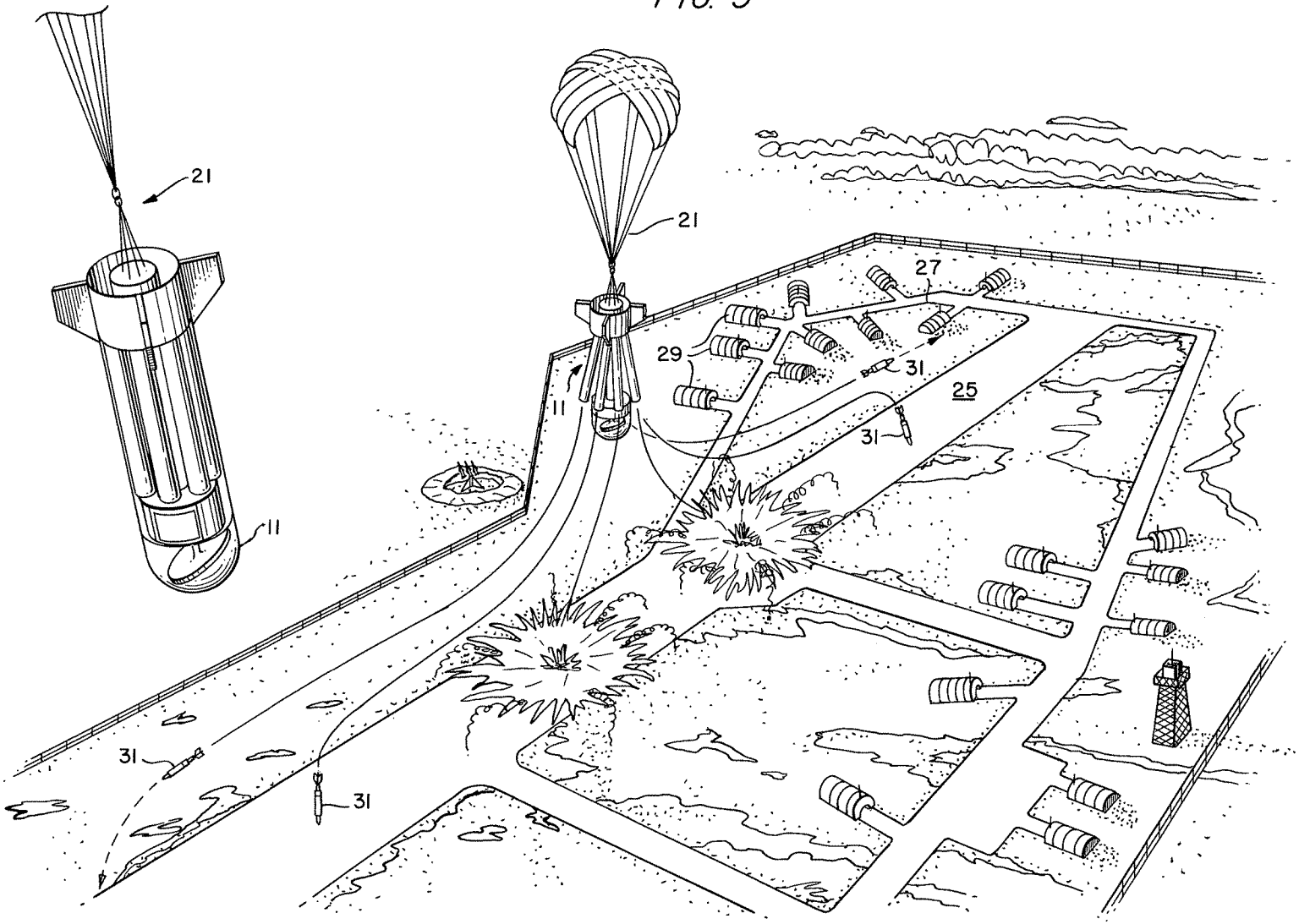
FIG. 3 schematically illustrates an attack on an airfield utilizing the missile system of FIG. 1.

FIG. 3 simulates an attack on an airfield using the missile system of the instant invention. As illustrated in FIG. 3, the booster portion 13 of each main missile 11 has been jettisoned, and the guidance and control portion 15, submissile launcher section 17, and radar and data processing section 19 of each main missile 11 are being delivered to the target area by means of an attached drag parachute 21 or some other means of deceleration such as a drag brake.

The target illustrated in FIG. 3 is an airfield which, when scanned by radar or other spectral sensors, has a readily identifiable signature comprising a wide, linear runway 25, narrow taxiways 27, and reinforced shelters 29 for airplanes. As will hereinafter be explained, when the missile system of the instant invention is delivered over a target, such as the runway illustrated in FIG. 2, the radar and data processing section 19 repeatedly scans the target area and processes the resulting data to identify the runway 25, the taxiways 27, and the shelters 29 individually as specific targets.

After target identification, the radar and data processing section 19 of each of the main missiles 11 assigns each of its associated submissiles to specific, identified targets and controls the submissile launcher section 17 to launch the submissiles 31 toward the assigned targets. As will be hereinafter explained, each of the submissiles 31 is physically linked to its associated main missile 11 for the transmission of submissile guidance information from the main missile 11 to the submissiles 31 individually and for the transmission of submissile position information from each of the submissiles 31 to its associated main missile 11. It is further contemplated that each submissile 31 may include a terminal homing device effective over short, range to acquire target data and to supply the target data to the main missile 11 over the transmission link or to employ the target data to guide itself to its assigned target.

The radar and data processing section 19 of each of the main missiles 11 tracks its associated submissiles 31 as they approach their assigned targets and the main missiles utilize the tracking information to guide the submissiles 31 through the transmission link. The transmission link as illustrated in FIG. 3 comprises a wire or fiber optic cable.

Figure 4:
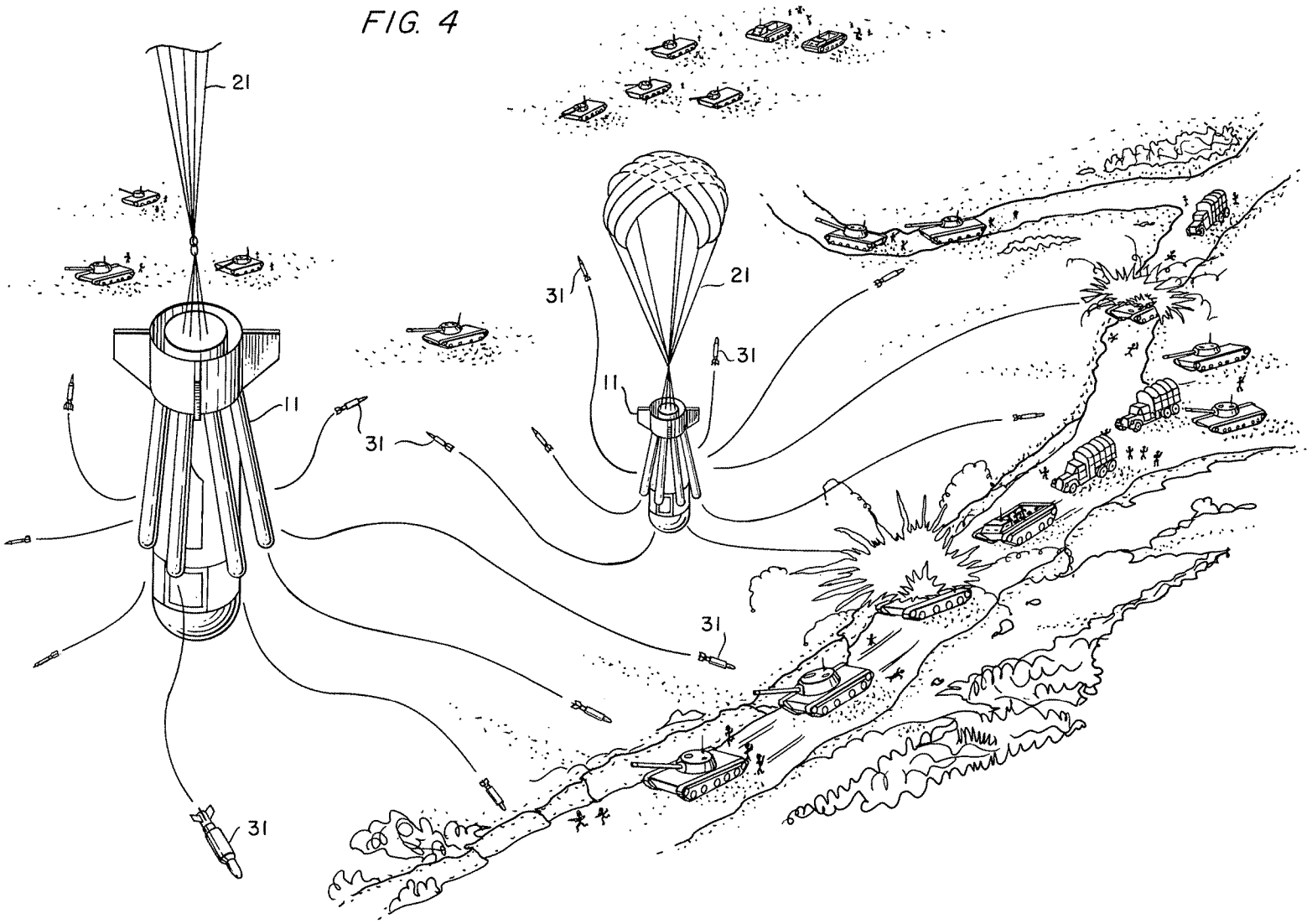
FIG. 4 schematically illustrates an attack on a column of armored vehicles by the missile system of FIG. 1.

FIG. 4 illustrates the missile system of the instant invention being deployed against targets comprising armored vehicles and trucks. Submissiles 31 launched from associated main missiles 11 are guided to their assigned targets by means of the links coupling each of the submissiles 31 to its associated main missile 11.

The utilization of an individual, dedicated link between the main missile 11 and each of its submissiles 31 eliminates the need for complex target acquisition and flight control processors on board of each of the submissiles 31. In the event that the submissiles do not include terminal homing devices, such operations and processing are performed entirely by the main missiles 11 with appropriate flight control signals being transmitted over the links. In accordance with the target information acquired by the main missiles 11, the associated submissiles 31 are guided individually toward the assigned targets for a substantial portion of their flights.

Figure 5:
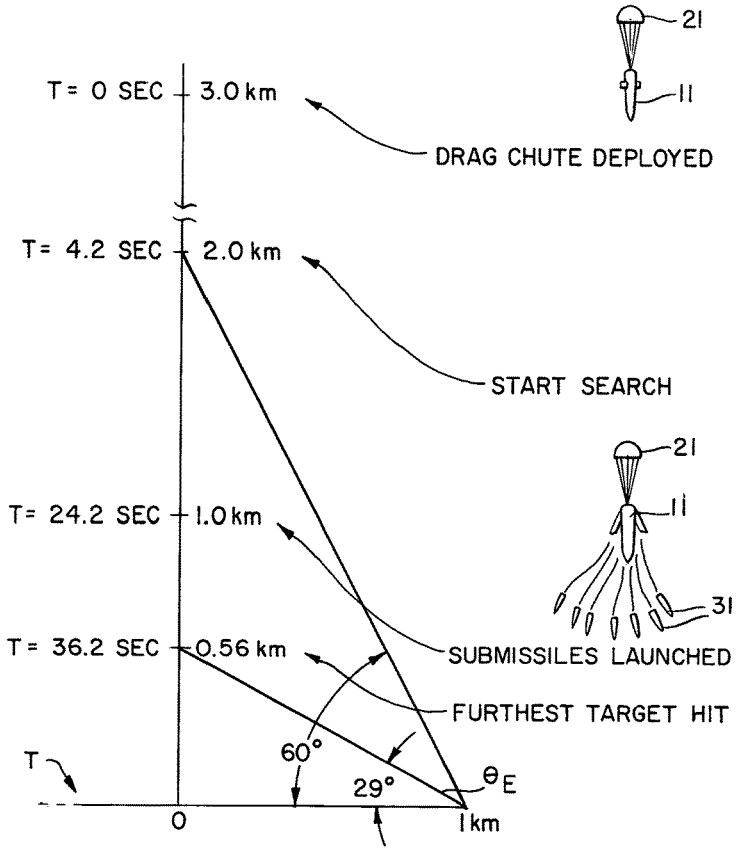
FIG. 5 illustrates an operational sequence of events for the missile system of the instant invention.

FIG. 5 schematically illustrates an example of the flight of a main missile 11 prior to, during, and after the launch of its associated submissiles 31. As illustrated in FIG. 5, at the height of approximately three kilometers above the target area T, the drag chute 21 of the main missile 11 is deployed and the main missile 11 approaches the target area T from an overhead position. The target area T is generally circular for a rotating radar antenna with a radius of one kilometer extending from the nadir point 141 (FIG. 12), i.e., the point at which the vertical axis of the descending main missile 11 intercepts the target area T. The target area T, however, can have a non-circular area, as explained below, depending upon the sweep pattern of the radar antenna. It is contemplated that whenever possible the shape of the sweep pattern will be selected in conjunction with the anticipated lay out of the target area and the distribution of targets therein.

When the main missile 11 has descended to an altitude of two kilometers above the target area T (a period of about four seconds after deployment of the drag device), the radar and data processing section 19 begins to scan the target area T repeatedly to search for specific identifiable targets.

The target scan and search processing continues for about 20 seconds until the main missile 11 descends to an altitude of approximately one kilometer above the target area T. During this time the radar may sweep the target area many times, for example 60 times when the antenna rotates at three revolutions per second. This large number of target area scans enables the missile system to acquire very high target resolution and to identify moving targets. Also, the wide aperture radar and multiple target area scans enables the missile system to resolve the position and identity of targets more readily than small aperture radars even under bad weather conditions.

At an altitude of one kilometer, the submissiles 31 are launched at assigned targets. Within the one kilometer radius target area T it will take, typically 10-12 seconds for a submissile 31 to hit the most distant target. At that time, the main missile 11 will have descended to an altitude of approximately 0.5 kilometers. During its descent from 1.0 kilometers to 0.5 kilometers, the main missile 11 tracks the flights of its associated submissiles 31 and the movement of any of their assigned targets, to guide the submissiles 31 continuously toward their assigned targets.

As seen from the scale of FIG. 5, the radial or elevational scan angle θE of the radar with respect to the vertical axis of the main missile 14 must increase as the main missile 11 descends from its initial search altitude of two kilometers to a submissile launching altitude of one kilometer in order to maintain a one kilometer radius scan of the target area T. For example, if the radial scan is initially 30° with respect to the vertical axis of the main missile 11 at an altitude of two kilometers, it is necessary for the radial scan angle to increase to maintain a constant area for the scanned target area as the main missile 11 descends. Accordingly, at a height of 0.5 kilometers, the radar is required to sweep a radial scan angle of approximately 60°.

It is within the spirit and scope of this invention, however, to use attack sequences which differ from that illustrated in FIG. 5.

The overhead approach to a target area T constitutes an additional feature of the instant invention and provides the main missile 11 with an extended period of time to scan a given target area T many times from essentially the same geometry before finally identifying targets and assigning submissiles 31 thereto. This facility for a large number of target area scans in combination with the higher quality data realized because of the large aperture sensor greatly increases the probability of identifying meaningful targets, particularly mobile targets, and of successfully targeting and guiding submissiles to the identified targets.

Figure 6A:
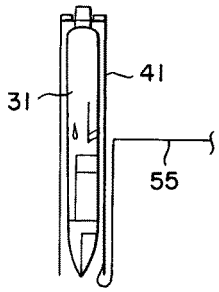
FIGS. 6(a), 6(b), and 6(c) illustrate the firing of a submissile from a launching member provided on the main missile of FIG. 2.
Figure 6B:
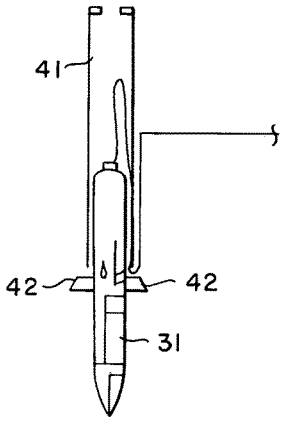
Figure 6C:
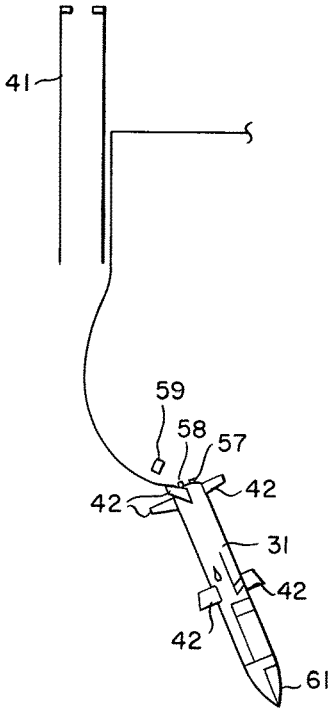

FIGS. 6(a)-6(c) illustrate cross sections of a submissile launching member 41 as shown in FIG. 2. The submissile 31 is linked to the radar and data processing section 19 of the main missile 11 by means of a hard-wired link 55. As explained above, the hard-wire link 55 comprises either a fiber optic or an electrical cable. Wire-guided missiles such as the "TOW" and "DRAGON" missiles are known in the art and could be modified to operate in the environment of the instant missile system. The TOW missile system is described in U.S. Pat. No. 3,711,046 issued to Barhydt et al. on Jan. 16, 1973.

As shown in FIG. 6(c), a spectral sensitive receiver 57 is provided in the tail of each of the submissiles 31. The receiver 57 is sensitive to the radar or other spectral pulses being transmitted by the main missile 11 toward the target area T. Assuming that the radar comprises a 35 ghz (gigahertz) radar transmitter/receiver, the receiver 57 is responsive to the 35 ghz frequency. Whenever the radar pencil-beam of the main missile 11 sweeps across the tail of a submissile 31, the receiver 57 senses the radar beam and returns a suitable data signal to the main missile 11 over the link 55. The return data signal communicates to the main missile 11 the angular coordinates of the submissile 31 relative to the main missile at the instant that the pencil-beam of the main missile radar has fallen on the submissile, thus enabling the main missile 11 to determine the location of each of its submissiles 31 with respect to its assigned target. Moreover, the return data signal enables the radar and data processing section 19 of the main missile 11 to track the flight path of each submissile 31 individually and to instruct the submissiles 31 over the links 55 to make corrections in their trajectories to ensure a hit of the selected targets by means of the assigned submissiles 31.

As shown in FIG. 6(c), a protective cap 59 is provided over the receiver 57 prior to and during the launch of the submissile 31 to protect the receiver 57 from damage. As is common in the art, the cap 59 is jettisoned during the flight of the submissile 31.

It would be apparent to one of ordinary skill in the art that in the event that the sensor in the main missile 11 is a passive sensor, e.g., optical, an active transmitter would be substituted for the receiver 57 on each of the submissiles 31. In the example where the sensor is an optical scanner, a pulsing light or laser is provided on the submissiles 31 with characteristic frequencies uniquely identifying each of the submissiles 31. The use of characteristic optical frequencies enables the main missile 11 to track the flight of each submissile 31 individually.

Figure 8:
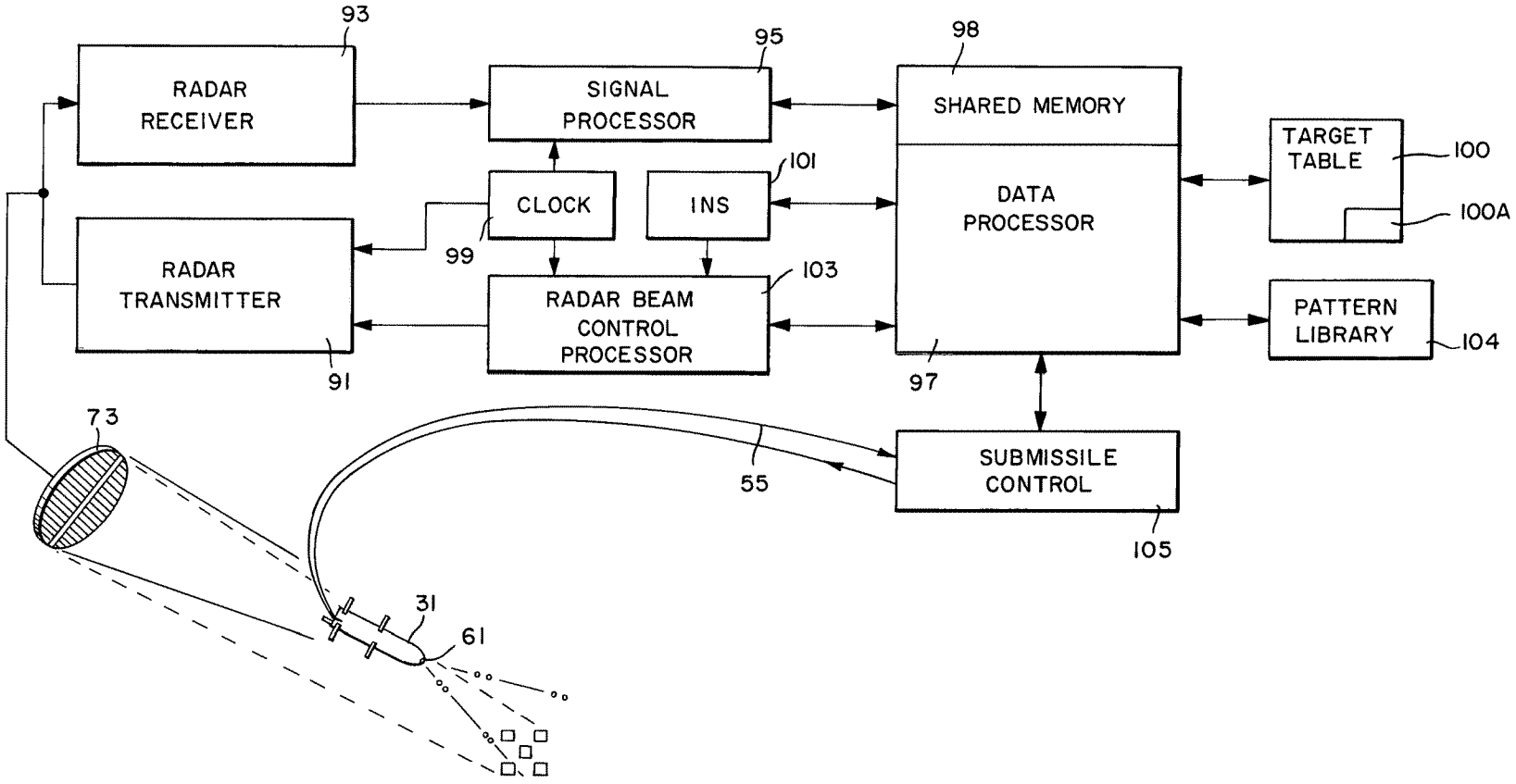
FIG. 8 is a block diagram of the radar, signal processing, data processing, and target selection subsystems of the missile system of the instant invention.
Figure 25:
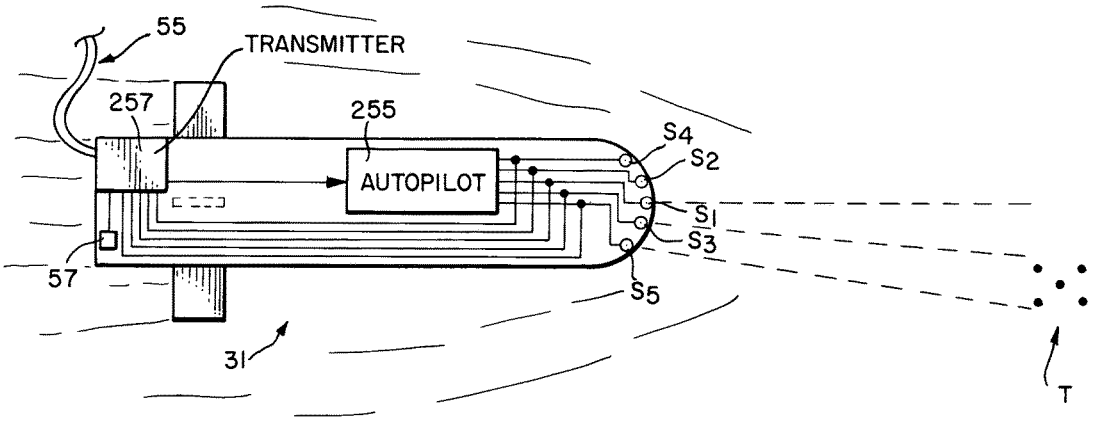
FIG. 25 is a cross section of a submissile with a terminal homing sensor usable by the missile system of the instant invention.

The submissile 31 depicted in FIGS. 6(c), 8, and 25 includes a terminal seeker 61, e.g., an infrared homing device, effective over very short distances as a means of achieving much higher hit probabilities against small, hard targets. When such a terminal seeker 61 is provided, the submissile 31 is guided into close proximity of an assigned target by the main missile 11 through the link 55. When the submissile is close to the target, the terminal seeker 61 is activated to acquire even higher target resolution at the much closer range. This information is either transmitted to the main missile by the transmission link 55 or is utilized by an onboard guidance system incorporated in the submissile 31 for the terminal homing phase. Terminal seekers 61 find particular application in engagements against small, moving targets, such as armored vehicles (FIG. 4), where higher target impact accuracy is particularly important.

A further advantage of the missile system of the instant invention, when compared to prior art smart weapons systems, is the ability of the main missile 11 to assign each of the submissiles 31 to specific associated targets. This prevents the above-described situation where a plurality of independent submissiles, each autonomously scanning for and choosing its own target, selects the same target because it has the most distinct signature. The links 55 between each of the submissiles 31 and the main missile 11 enable the radar and data processing section 19 of the main missile 11 to manage the entire engagement positively in a manner to be described below.

3. Main Missile Structure, Electronics, and Operation

Figure 7A:
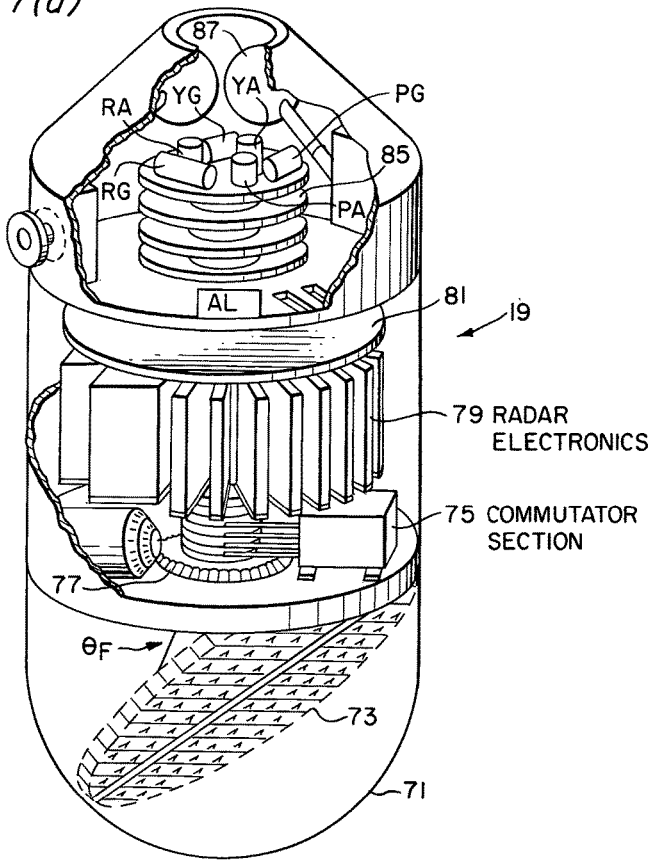
FIG. 7(a) illustrates an embodiment of the radar antenna, control electronics, inertial navigational system, and other electronic components of the missile system of FIG. 1.

FIG. 7(a) illustrates the radar and data processing section 19 of the main missile 11 in more detail. The radar and data processing section 19 includes a radome 71 enclosing a radar antenna 73. A suitable radar antenna includes a slotted waveguide antenna. It is also contemplated that a stripline antenna could be employed.

A commutator section 75 transmits data from the radar rotated by a drive mechanism 77 to stationary avionics and controls on the main missile 11. The radar electronics 79, as shown in FIG. 7(a), are mounted on the longitudinal axis of a drive mechanism 77 for rotation therewith.

The output of the radar electronics 79 is stored in a signal storage and retrieval means. As embodied herein, the signal storage and retrieval means comprises a shared memory (described below) which could be mounted on a support member 81.

An inertial navigation system 85, as is well-known in the art, is provided to sense the orientation of the main missile 11, i.e., North, South, East, West, and whether the main missile 11 is oscillating, drifting in the wind, etc. Flight control surfaces driven by pneumatic actuators 87 compensate for the motion of the radar and data processing section 19 of the main missile 11.

A suitable inertial navigation system 85 and pneumatic actuators 87 are those as employed in the WASP missile system known to those of ordinary skill in the art. Part of the WASP inertial navigation system is a Z-8000 microprocessor produced by INTEL.

FIG. 7(a) also schematically illustrates the sensors of the inertial navigation system 85. These sensors include pitch rate, yaw rate, and roll rate gyroscopes PG, YG and RG, respectively, and pitch rate, yaw rate, and roll rate accelerometers PA, YA, and RA, respectively. These sensors and an altimeter AL operate in a manner well-known in the art to supply the altitude h of the main missile 11 above the target area T along with other spatial orientation information signals. The sensors of the inertial navigation system 85 also generate signals $\theta_y$ and $\theta_z$ indicating displacement of the main missile 11 about its y and z axes, respectively.

The radar electronics 79 use frequency shifts to scan the pencil-beam of the antenna 73 in elevation as the antenna 73 scans azimuthally by rotation about the vertical axis of the descending main missile 11. This scan pattern results in the target area T being scanned and analyzed in a grid-like manner. Such frequency shifted antennas are known in the art.

More specifically, a 35 ghz radar system equipped with a 20 inch aperture antenna of the slotted waveguide type known in the art is suitable for use in the instant missile system. Azimuthal sweeps of the antenna 73 are mechanically controlled by rotation of the entire radar electronics 79 about the vertical axis of the main missile 11 in tandem with the rotation of the antenna 73 the drive mechanism 77. The antenna 73 is boresighted at a preselected angle $\theta_F$ off the vertical axis of the main missile 11 with the antenna manifolds being orthogonal to the boresight. A suitable boresight angle is 25°.

If the target against which the main missile 11 is expected to be deployed is primarily linear, e.g., an airfield runway, the antenna drive mechanism 77 oscillates the antenna 73 with regard to the nadir point of the main missile 11, without the need for the commutator section.

In such an example, as the radar 19 rotates in azimuth, a nominal 1° pencil-beam is also scanned in elevation under the control of appropriate frequency shifters. The frequency shifters are programmed to control the angle of the scan in such a way that the same sized target area T on the ground is illuminated as the radar 19 descends. The pulse repetition frequency (PRF) of the radar is varied by the radar electronics from a first PRF value to a lower PRF value as the scan angle θ moves from maximum to minimum elevational scan angle for each elevational scan. The net effect of these controls is that a uniform illumination of a radial sector of the target area T is achieved. In this way a ground navigation grid system corresponding to the radar sweep and radar return pulse patterns is established.

As stated above, each submissile 31 is equipped with a receiver 57 tuned to the frequency of the radar. Whenever the radar beam illuminates a submissile 31, the receiver 57 on the submissile 31 amplifies the received signal and transmits a response signal through the corresponding link 55 to its associated main missile 11. The transmitted signal incorporates the PRF of the radar pulse or pulses received and reports it over the wire 55 to a numbered terminal serving only that submissile 31; this enables the main missile 11 to resolve the positions of the submissiles 31 uniquely with reference to the ground navigation grid. The azimuthal position is determined by the time/number of the radial scan pulse. Thus, the submissiles 31 are not processed as targets by the main missile 11 and the influence of background clutter is prevented because the outbound radar pulses are received, amplified, and reported by the link 55 to a terminal or part in the main missile 11 uniquely associated with a specific submissile 31.

U.S. Pat. No. 3,797,014 entitled "Automatic Radar Target Detection and Scan Conversion System," issued to Tompkins et al on Mar. 13, 1974, is an example of a system for establishing a grid relationship within a target area. A strip line or other antenna, or phase shift control instead of frequency shift control, could be employed with suitable matched radar electronics in a manner well-known in the art without departing from the scope and spirit of the invention.

Figure 7B:
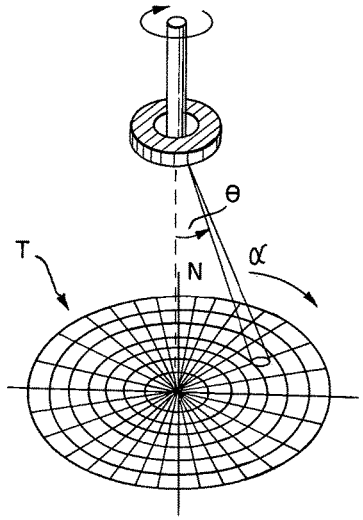
FIGS. 7(b) and 7(c) illustrate radar scan patterns suited to the engagement of distributed target patterns 7(b) and linear target patterns 7(c).
Figure 7C:
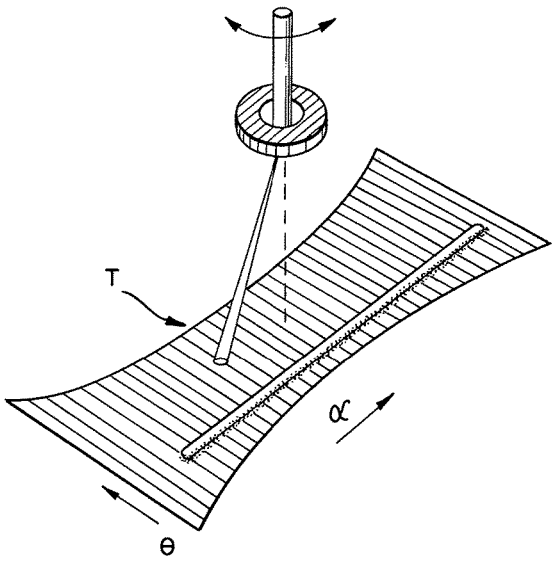

FIGS. 7(b) and 7(c) illustrate two different scan patterns for the radar antenna 73 of the instant invention. In FIG. 7(b), the radar antenna 73 is rotated about the nadir point and approximately 320 elevation (radial) scans are performed during a complete 360° azimuthal sweep. The azimuthal angle will hereinafter be referred to as α.

Each, elevation scan sweeps between the ground nadir point and an angle θ defining the exterior boundary of the target area T. As seen from FIG. 7(b), the combination of elevational sweeps and azimuthal rotation divides the target area T in a grid-like pattern.

Exemplary parameters for a pulsed waveguide radar unit 19 include a frequency of 35 ghz, a 20 inch diameter aperture, a 1.2° beamwidth, and a gain of 45 db. The unit further manifests sidelobes of 20 db down, receiver noise of 13 db, a 50 nanosecond pulse step, and peak power of 40 W. A 360° azimuth scan is mechanically performed at a rate of three revolutions per second during both the target search and submissile tracking modes. The elevation scan is electronically produced through a maximum angle (θ) of ±30° at 320 elevations/revolution during the target search mode and 640 elevations/revolution during the submissile tracking mode. The radar unit has a PRF of 38,000/sec. and an average power of 0.08 W during the target search mode and 100,000/sec. and 0.20 W during the submissile tracking mode. The average Δθ and Δα is 0.620 at all times.

The scan pattern as illustrated in FIG. 7(b) is most suitable when targets are anticipated to be distributed about the target area T.

The scan pattern illustrated in FIG. 7(c) is most suitable for linear target arrays such as an airfield runway or a roadway. A plurality of parallel sweep lines within the target area T are scanned. Each sweep line comprises a plurality of radar pulses transmitted through an angle θ defining the width of the scan pattern, i.e., the length of each sweep line. To generate a scan pattern as shown in FIG. 7(c), the antenna drive mechanism 77 oscillates the antenna 73 with respect to the vertical axis of the descending main missile 11.

A pulsed waveguide radar unit 19 suitable for the linear target scan could include a 20 inch diameter aperture, a 35 ghz frequency, a 1.2° beamwidth, a 40 db gain, a 17 db down antenna side lobe level, and a receiver noise of 13 db. Other suitable parameters include a 150 nanosecond pulse width, 50 W peak power, 84,000/sec. PRF, and 0.63 W average power. The azimuthal scan is performed mechanically at three oscillations per second with a beam width of 1°. Elevational scanning is performed electronically at 540 cycles per second with a Δθ of 0.2°.

FIG. 8 illustrates the data processing portion of the radar and data processing section 19. The radar antenna 73 is coupled to a radar transmitter 91 and to a radar receiver 93. The radar receiver 93 includes a buffer for radar returns reflected from the target area T scanned by the radar antenna 73. The buffered radar returns are gated from the radar receiver 93 to a signal processor 95 under the control of a clock 99. As will hereinafter be described, the radar returns are selectively gated into the signal processor 95 so that fewer than the total number of radar returns are transferred from the radar receiver 93 to the signal processor 95.

The signal processor 95 is coupled to a data processor 97 for transfer of information therebetween. Radar returns meeting certain threshold criteria are supplied to the data processor 97 for storage in a shared memory 98 and for additional analysis including pattern identification processing for target identification and selection.

The data processor 97 is also coupled to an inertial navigational system (INS) 101 for the bidirectional transfer of information therebetween. The inertial navigation system 101, as described above with reference to FIG. 7(a), stabilizes the main missile 11 for roll, pitch, and yaw as it descends toward the target area T.

The outputs of the inertial navigational system 101 are also employed by the data processor 97 to standardize the radar returns being transferred thereto through the signal processor 95. Such standardization includes compensation for oscillations of the descending main missile 11 with respect to its vertical axis, accounting for wind-drift of the main missile 11 as it descends toward the target area T under the influence of the drag device 21, and monitoring the constantly changing altitude h of the main missile 11.

More specifically, a sway compensation circuit 102 (FIG. 9) generates the signal $\theta_{E,C}$, in a manner described hereinafter, to account for any oscillation of the main missile 11 about its Y axis. The radar control processor 103 also includes circuitry (FIG. 10(a)) for compensating for the descent of the main missile 11 toward the target area T.

A radar beam control processor 103 is also coupled to the data processor 97 for the bidirectional transfer of information therebetween. The inertial navigational system 101 supplies input signals to the radar beam control processor 103 which relate to the spatial orientation of the main missile 11.

In the case of an electronically controlled antenna 73, the radar beam control processor 103 controls the frequency shifting of the radar antenna 73 to increase the radial scan angle ($\theta$) of the target area by the antenna 73 during the descent of the main missile 11 to maintain a target area scan of constant diameter as discussed with regard to FIG. 5. The radar beam control processor 103 controls the operation of the radar transmitter 91 to perform the radial (elevation) and azimuthal scans in a manner readily understood by one of ordinary skill in the art familiar with radar systems. The clock 99 provides appropriate timing signals which are utilized during the operation of both of the radar beam control processor 103 and the radar transmitter 91.

As illustrated in FIG. 8, a submissile control module 105 is coupled to the data processor 97 for the bidirectional transfer of information to each of the submissiles 31 by individual links 55. Each link 55 comprises a two directional data path, as in a multiplexed transmission line. The submissile control 105 reports to the data processor 97 whenever a submissile 31 is illuminated by the pencil-beam from the antenna 73. This enables the data processor 97 to track the position of the submissile 31 constantly with respect to the target area T as well as the movement of any identified targets therein. The data processor 97 computes appropriate flight control signals for the submissile 31 transmitted through the submissile control 105 and the link 55.

As stated above, suitable links 55 include a wire as used in the TOW and DRAGON missiles, or a reinforced optical fiber. Moreover, it is contemplated that the link could be microwave or optical, although hard-wired links are less susceptible to interferences and electronic countermeasures than other types of transmission links.

As shown in FIG. 8, the submissile 31 can include a short range terminal homing sensor 61. Such a submissile is explained in more detail with reference to FIG. 25.

Figure 9:
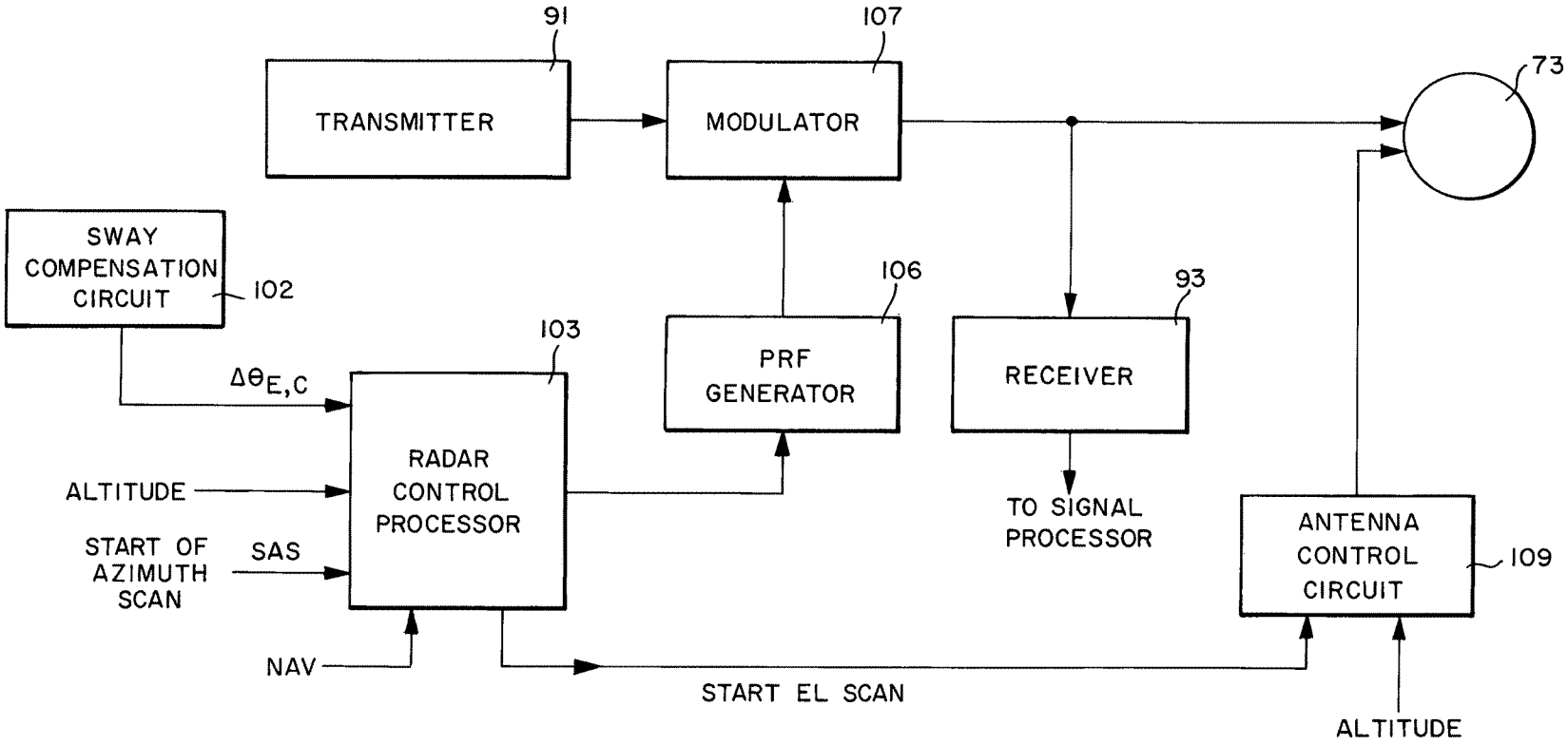
FIG. 9 is a block diagram of the radar electronics of the missile of FIG. 1.

FIG. 9 illustrates the interrelationship between the radar receiver 93, radar transmitter 91, and the radar control processor 103 in more detail. The radar control processor 103 receives as an input a signal representing the altitude h from the altimeter AL as well as a signal, SAS, from the data processor 97 indicating the start of an azimuthal scan, i.e., a sweep of the target area T. The SAS signal is generated by the INS each time the antenna passes due North during an azimuthal scan. The radar control processor 103 initiates the generation of radar pulses by the PRF generator 106. The PRF generator 106 is connected as an input to a modulator 107 which also receives the output of the radar transmitter 91. The modulator 107 gates radar pulses to the antenna 73 under the control of the PRF generator 106 and the transmitter 91.

The altitude signal h of the main missile 11 is alternatively generated by the radar control processor 103 by timing the interval to transmit and receive the reflection of a radar pulse aimed at the ground nadir point. Such a ranging or altitude generation procedure is well-known within the radar art.

The receiver 93 receives the radar returns reflected from the target area T and captured by the antenna 73. The radar returns are transmitted to the signal processor 95 by the radar receiver 93. Each radar return corresponds to a specific subarea or portion of the scanned target area T.

An antenna control circuit 109 receives as one input the altitude h from the altimeter AL and a control signal from the radar control processor 103 marking the start of an elevation scan, i.e., one of the plurality of radial scans performed for each azimuthal scan. If the antenna 73 is a phase shifted antenna, the antenna control circuit 109 establishes the necessary currents for the phasers within the antenna 73 to increase the radial sweep or scan by the radar. As stated with reference to FIG. 5, as the main missile 11 descends during the target area scanning phase and the missile guidance phase, the radial scan angle is increased in order to maintain a target area T of constant radius.

If the antenna 73 is a frequency shifted antenna then the antenna control 109 modulates the frequency output of the antenna 73 to effect a scan of the target area T through the proper radial scan angle $\theta_E$ as the main missile 11 descends toward the target area T.

4. Main Missile Scale Control and Sway Compensation

FIG. 10(a) illustrates in more detail the radar control processor 103 of FIG. 9. The altitude h, as outputted from the altimeter AL, is supplied to a first read only memory (ROM) 115 and a second ROM 117. The first ROM 115 includes, for example, 4096 twelve bit storage locations, storing values representing log 10/h. The ROM 117 stores 4096 twelve bit representations of the elevation or radial scan angle with respect to vertical, $\theta_{E0}$ (initial radial scan angle see FIG. 5). The value $\theta_{E0}$ is supplied as an addressing input to a third ROM 119 which stores 4096 twelve bit representations of log $\cos^2 \theta_E$. A fourth ROM 121 stores 4096 twelve bit representations of $\Delta\theta_E$ (change in radial scan angle), and outputs the appropriate representation of that change in the radial scan angle in response to the input of an address defined by log 10/h+log $\cos^2 \theta_E$.

The change in radial scan angle, $\Delta\theta_E$, is supplied as an input to a microprocessor 123, for example an Intel 8086, which outputs the actual scan angle, $\theta_{E,A}$ to the control implementation circuitry 109.

The microprocessor 123 also controls the addressing of the ROMs 115, 117, 119, and 121 such that for a given altitude h, as received from the altimeter AL, the control circuit 109 will be supplied with a series of radial scan angles $\theta_E$ to control the radar scan to traverse a particular radial scan path. It is by means of the antenna control circuitry 109 (FIG. 9) that radar pulses are directed to produce the proper radial scans by the radar for each radius in an azimuthal scan of the target area T. The microprocessor 123 controls the addressing of and receives the outputs from the four ROMs 115, 117, 119 and 121 to generate the radial scan angle $\theta_{E,A}$ to be supplied to the antenna control circuit 109 for the antenna 73.

The ROM 117 is also addressed by an address representing the altitude h as supplied by the altimeter AL of the inertial navigation system 101. The 12-bit values outputted by ROM 117 correspond to the initial radial scan angle $\theta_{E0}$.

The angle, $\theta_{E0}$ corresponds to the angle with respect to the vertical axis of the descending main missile 11 at which a radial or elevation scan is to commence. This angle, $\theta_{E0}$ is measured with respect to the target area T, i.e., the ground.

The ROM 119 is addressed by a value corresponding to the initial radial scan angle, $\theta_{E0}$, and outputs the log $\cos^2 \theta_{E0}$. The ROM 121 is addressed by values representing the sum of the outputs of the ROM 115 and the ROM 119. Thus, the ROM 121 is addressed by log 10/h+log $\cos^2 \theta_E$.

The outputs, $\Delta\theta_E$, correspond to the increments or changes in the radial scan angle associated with all of the radar pulses transmitted as part of a radial scan of the target area T. For example, if the initial radial scan angle $\theta_{E0}$ is equal to 60°, the first radar pulse will be transmitted by the antenna 73 at an angle 60° from the vertical axis of the descending main missile 11. Since this is the first pulse for a particular radial scan, $\theta_E$ will be equal to zero. The second pulse for that particular radial sweep, however, is displaced by a small angular increment with respect to the initial radial scan angle. This displacement, $\Delta\theta_E$, may be 0.6° and, therefore, the second pulse in the radial scan may be directed by the antenna 73 at an angle approximating 59° 40' with respect to the vertical axis of the main missile 11.

This decrement in the radial scan angle $\Delta\theta_E$ continues until all of the pulses included in one complete radial scan have been transmitted by radar transmitter 91 and antenna 73. Upon the completion of one radial (elevational) scan, the next successive radial scan is commenced by again addressing the first storage location in ROM 121 with the sum of the outputs of the ROMs 115 and 119. The addresses in the ROM 121 are sequentially addressed to output the changes in radial scan angle to scan the entire second radius. Such radial scan processing is repeatedly performed until a complete azimuth sweep has been completed.

It should be understood that the above values for $\theta_{E0}$ and $\Delta\theta_E$ are exemplary only.

Referring again to ROM 117, $\theta_{E0}$ is approximated by the $\tan^{-1}$ h/1000. The microprocessor 123 receives the outputs of ROM 115, ROM 119 and ROM 121. Initially, microprocessor 123 calculates the value $\theta_{E1}$ equal to 10/h+$\cos^2 \theta_{E0}$ from the outputs of ROM 115 and 119. An additional input, $\theta_{E,C}$, is supplied as an input to the microprocessor 123. As will be subsequently discussed, $\theta_{E,C}$ is a value for correcting the sway of the main missile 11 with respect to its y and z axes. From these values, the microprocessor 123 calculates $\theta_E=\theta_{E0}-\theta E_1-\theta_{E,C}$. Finally, the microprocessor 123 generates the actual radial scan angle for a particular pulse in a radial scan, $\theta_{E,A}=\theta_E-\theta_E$.

FIG. 10(b) illustrates a suitable program to be executed by the microprocessor 123 in accordance with the previous description of FIG. 10(a). Initially, the display correction angle, $\theta_{E,C}$, is received by microprocessor 123 and is transferred from an accumulator A to a register R1. Next, the altitude h, as supplied by the altimeter AL of the inertial navigation system 101, is transferred from the accumulator to a register R2. A read is then made of the ROM 117 by outputting the altitude h to the address lines (not shown) of the ROM 117. The initial radial scan angle $\theta_{E0}$, is received into the accumulator of the microprocessor 123, and the contents of the register R1 are subtracted from the accumulator with the result being moved from the accumulator to the register R1. The altitude h is transferred from the register R2 to the accumulator and is outputted to the address lines (not shown) of the ROM 115 during a read operation. The log 10/h outputted from the ROM 115 is stored in the accumulator. These program steps are performed once for each radial scan of the target area T.

The remaining instructions in FIG. 10(b) are executed for each radar pulse transmitted within a radial scan. Initially, the radial scan angle, $\theta_E$ is moved from the register R1 to the accumulator. The contents of the accumulator are transmitted to the address lines (not shown) of the ROM 119 and the output log $\cos_2 \theta_E$ of the ROM 119, is received in the accumulator of the microprocessor 123. The log $\cos^2 45°$ is added to the accumulator and the log of the altitude, log h, is subtracted from the accumulator. The accumulator is outputted to the address lines of the ROM 121 and the change in scan angle, $\Delta\theta_E$, is received into the accumulator of the microprocessor 123. The contents of register R1 are added to the accumulator and the accumulator is moved to the register R1. At this stage both the accumulator and the register R1 have stored therein a value representing the actual radial scan angle for a specific radar return within a radial scan. This value $\theta_{E,A}$, is transmitted to the control circuit 109 associated with the antenna 73.

FIG. 11(a) illustrates in more detail the main missile sway compensation subsystem 102 (FIG. 9) of the instant missile system. This subsystem includes a $\theta_z$ register 127, a $\theta_y$ register 129, a log cos ROM 131, a $\log^{-1}$ ROM 133, a $\cos^{-1}$ ROM 135, and a microprocessor 137, for example an Intel 8086. The value $\theta_z$ stored in the register 127 corresponds to the rotation of the main missile 11 about its z axis as it descends toward the target area under the control of the drag chute 121. The register 129 stores the value of $\theta_y$ corresponding to the rotation angle around the y axis of the main missile 11 as it descends toward the target area. The log cos ROM 131 outputs the log cos $\theta_z$ and log cos $\theta_y$ when addressed by the values stored in the registers 127, 129, respectively.

The log cos ROM 131 outputs a value corresponding to the log cos $\theta_F$ where $\theta_F$ is the boresight angle of the antenna 73 with respect to the vertical axis of the descending main missile 11. FIG. 7(a) illustrates the antenna 73 displaced at an angle $\theta_F$ with respect to the vertical axis of the descending main missile 11.

Initially, the microprocessor 137 subtracts log cos $\theta_z$ and log cos $\theta_y$ from log cos $\theta_F$. The resulting value is supplied to $\log^{-1}$ ROM 133 where the inverse logarithm of the difference is generated as an output. Finally, the microprocessor 137 generates the value $\theta_{F'}$ by transferring the output of the $\log^{-1}$ ROM as an address input of the $\cos^{-1}$ ROM 135. The microprocessor 137 then computes the sway correction angle $\theta_{E,C}=\theta_F-\theta_{F'}$.

It is assumed for the above discussion with respect to FIG. 11(a), that $\theta_z$, $\theta_y$ are less than 45° and that each of the ROMS 131, 133, and 135 has a capacity of 4,096 12-bit words giving a degree of accuracy of 0.0112.

As discussed with respect to FIG. 10(a), the sway angle correction signal $\theta_{E,C}$ is supplied as an input to the microprocessor 123 of the antenna control circuit 109. Moreover, the microprocessor 123 and the microprocessor 137 can be combined in one high speed microprocessor in an alternate embodiment.

FIG. 11(b) illustrates the instructions included in a program for controlling microprocessor 137 to compute the display correction angle $\theta_{E,C}$. Initially, $\theta_z$ is read from the register 127 and transmitted to the address lines (not shown) of log cosine ROM 131. The output of the log cosine ROM 131, log cos $\theta_z$ is received in the accumulator of microprocessor 137 and is transmitted to the register R1. A similar series of instructions is performed for $\theta_y$ and the sum of the logs of the cosines of $\theta_z$ and $\theta_y$ is computed by adding the contents of register R1 to the contents of the accumulator and moving the contents of the accumulator to the register R1.

The next instruction loads the vertical offset angle of the antenna 73, $\theta_{F'}$ into the accumulator. The log cosine $\theta_{F'}$ is computed by subtracting the contents of the register R1 from the contents of the accumulator. The contents of the accumulator are then outputted to the address lines (not shown) of the $\log^{-1}$ ROM 133 and the inverse logarithm of cos $\theta_{F'}$ is received into the accumulator of the microprocessor 137 from the ROM 133. The contents of the accumulator are supplied to the address terminals (not shown) of $\cos^{-1}$ ROM 135 and the inverse cosine of the inverse logarithm of $\theta_{F'}$ is received into the accumulator of the microprocessor 137. This value is transferred to register R1. The offset angle of the antenna 73 from the vertical axis of the main missile 11 is loaded into the accumulator and the offset error correction angle $\theta_{E,C}$ is computed by subtracting the contents of the register R1 from the contents of the accumulator.

5. Target Area Scan Pattern

Figure 12:
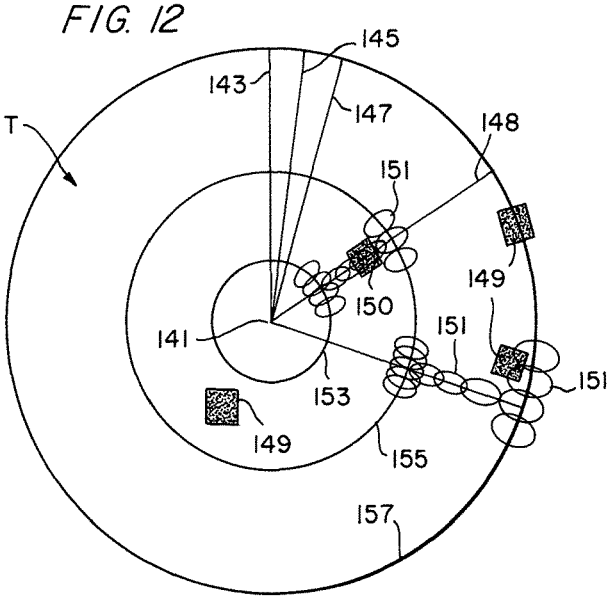
FIG. 12 schematically illustrates the radar scanning pattern of the pencil-beam of the radar of FIG. 7(b) within a target area as employed by the missile system of the instant invention.

FIG. 12 illustrates the scan pattern of the radar of the main missile 11. The ground nadir point 141 lies at the intersection of the vertical axis of the descending main missile 11 and the target area T. As the radar antenna 73 rotates, it traverses one azimuthal sweep of the target area T commencing, for example, from the radial sweep 143 and proceeding in a clockwise direction. Additional radial sweeps 145, 147 are illustrated in FIG. 12.

As explained above, a radial sweep commences at the radial sweep angle $\theta_{E0}$ which corresponds to an intersection of the radial sweeps 143, 145, 147 and the exterior azimuth 157 of the target area T. Each radial sweep proceeds from the exterior azimuth 157 to the nadir point 141. It would, however, be within the spirit and scope of the instant invention for the radial sweep to commence at the nadir point 141 and traverse the sweep angle $\theta_{E0}$ terminating at the exterior boundary 157 of the target area T.

A plurality of targets 149, 150 is illustrated within the target area T defined by the external azimuth 157 of FIG. 12. A plurality of radar returns 151 as shown in FIG. 12 are mapped on the target area T. Each of the radar returns 151 corresponds to the reflection of a radar pulse from the surface area of the target area T and is received by the radar receiver 93. As shown in FIG. 12 the areas in the target area T associated with the radar returns 151 overlap each other both azimuthally and radially.

In the instant embodiment, there are 320 radial sweeps per azimuthal scan in the initial target search mode. The number of radial sweeps is increased to 640 per azimuthal scan during the subsequent terminal guidance phase. Accordingly, 320 or more radar return areas 151 are spaced along the exterior azimuth 157 defining the peripheral boundary of the target area T. Each radial scan 143, 145, 147 includes approximately 200 radar pulses and has associated therewith 200 radar returns. Thus, a radial scan 148 has 200 overlapping radar return areas 151 spaced between the nadir point 141 and the azimuth 157 defining the exterior boundary of the target area T. As stated above, the distance from the nadir point 141 to the azimuth 157 is approximately 1,000 meters.

As evident from FIG. 12, if the same number of radar returns is received for each azimuth of decreasing radius, the amount of overlap of the radar return areas 151 would be greater for an azimuth closer to the nadir point 141 than for one closer to the boundary azimuth 157. Accordingly, it is one function of the radar control processor 103 to limit the number of radar returns 151 accepted by the radar receiver 93. This results in fewer radar returns being accepted along the radius 148 between the nadir point and the azimuth 155 than between the azimuth 155 and the boundary azimuth 157.

Figure 13:
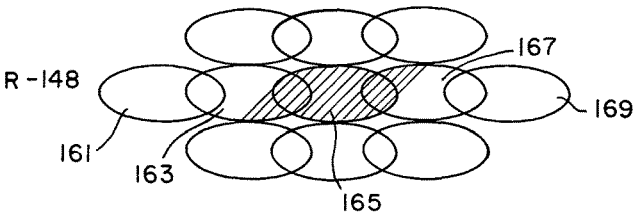
FIG. 13 is a more detailed view of the radar scan pattern of FIG. 12 showing the overlapping coverage of the area searched by the pencil-beam of the radar.

FIG. 13 schematically illustrates the radar returns along the radial scan line 148 proximate the target 150. Specifically, the row R-148 includes the radar returns 161, 163, 165, 167, and 169. Radar return 165 correlates to the radar return shown in FIG. 12 to encompass a portion of the target area T within which the target 150 is positioned. As illustrated in FIG. 13, the target 150 is shown to fill completely the radar return 165, and to overlap radially into the areas corresponding to radar returns 163 and 167. The amount of overlap of the target 150 is shown to exceed the amount of overlap between the radar returns 163,165 and 165,167.

As will hereinafter be disclosed, the signal processor 95 and the data processor 97 examine the radar returns as supplied by the radar receiver 93 in order to locate, to identify, and to select the targets which have the strongest target signature within the target area T of the main missile 11. If for example, the main missile 11 includes eight submissiles 31, the signal processor 95 and data processor 97 will process the radar returns supplied by radar receiver 93 in order to identify and to select the eight targets with the strongest signatures and to assign the eight submissiles 31 individually to the eight identified targets.

The radar receiver 93 operates in a conventional manner. That is, it produces an analog electrical signal having an amplitude which varies continuously according to the strength of the radar returns received by the antenna 73. As commonly understood, the amplitude of this electrical signal produced by the radar receiver 93 includes a portion corresponding to the background clutter of the target areas associated with the radar returns. Additionally, the amplitude of the analog signal includes a component identifying any targets that have been scanned. Accordingly, the signal processor 95 and data processor 97 together identify those portions of the analog signal produced by the radar receiver 93 which correspond to actual targets scanned within the target area T and those portions of the analog signal which correspond to noise or clutter. The portion of the analog signal produced by the radar receiver 93 corresponding to background clutter is separated out and disregarded by the signal processor 95 and the data processor 97.

Figure 14A:
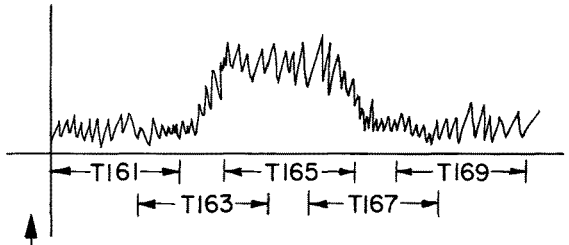
FIG. 14(a) is an example of an analog signal representing the radar returns from the scanning of a target area by the radar of the missile system of the instant invention.

FIG. 14(a) illustrates the analog signal produced by the radar receiver 93 for a portion of the radial scan 148. More specifically, FIG. 14(a) represents the electrical signal corresponding to the radar returns in row R-148 shown in FIG. 13. The amplitude of this electrical signal includes a background noise portion as well as a portion corresponding to reflections of the radar pulses off of the target 150. Accordingly, as shown in FIG. 14(a), the amplitude of the signal rises above the background noise level during the time period corresponding to the overlap of radar returns 163,165 and remains at a level significantly higher than the background level into the time period corresponding to the overlap of the radar returns 165,167.

As will be explained below, the signal processor 95 filters and detects the analog signal and converts it into a digital signal having a value corresponding to the strength of the analog signal. After short-term and background averaging, the components of the converted digital signal correlated with background noise and non-target radar returns are identified and disregarded.

Figure 14B:
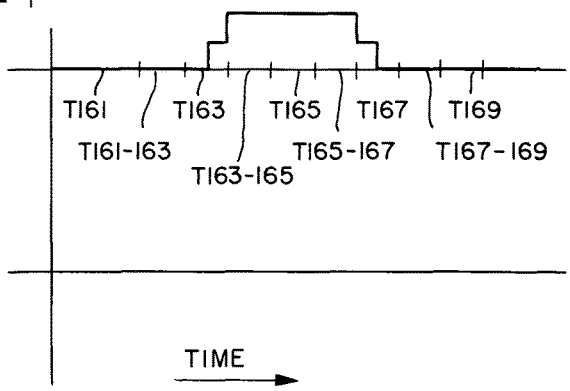
FIG. 14(b) is a digital representation of the analog radar return signal illustrated in FIG. 14(a).

FIG. 14(b) illustrates a digital representation of the analog signal of FIG. 14(a) with the background noise component separated therefrom. As shown in FIG. 14(b), the digital signal has a low value for the time periods T161, T161-163, and a portion of T163 which are associated with radar return 161, the overlap of radar returns 161, 163, and radar return 163, respectively. The digital signal has a higher value for a portion of time period 163 and an even greater magnitude for the time periods T163-165, T165, and T165-167 associated with the overlapping portion of radar returns 163,165, radar return 165, and the overlapping portion of radar returns 165,167. The digital signal returns to a low level for the time periods associated with a portion of radar return 167, the overlapping portion of radar returns 167,169, and radar return 169 associated with time periods T167, T167-169, and T169, respectively.

It can be seen from FIGS. 14(a) and 14(b) that the signal processor 95 generates an output digital signal which correlates very precisely to the signal values of the radar returns reflected from the target 150. As will be hereinafter explained, the data processor 97 performs azimuthal signal averaging in order to develop a set of two dimensional coordinates identifying and specifying the location of a target within the target area T of the main missile 11.

6. Signal Processor

Since range information need not be employed in the missile system of the instant invention, performing peak detection on the radar returns constitutes a basic simplification in the signal processor 95. Accordingly, a single five microsecond analog-to-digital (A/D) converter is employed to digitize the radar returns and develop a simplified scenario map corresponding to the scanned target area T. The scenario map is a binary representation of the target area divided into a two dimensional grid or array of bins. Each bin corresponds to a different radar return and, therefore, correlates with a specific subarea of the entire target area scanned. Moreover, each bin is uniquely identifiable by a radial scan line number and a radar pulse number or azimuth number, within that radial scan.

This feature of forming a binary scenario map of the target area is disclosed in U.S. Pat. No. 3,633,173 entitled "Digital Scan Converter," issued to C. F. Edge on Jun. 4, 1972. Such a scenario map is also employed in the above-referenced Tompkins et al. patent.

Within the signal processor 95, the digitized radar returns are selectively gated into a short-term averager which provides a process gain proportional to the square root of the average of the values of the radar returns. The radar returns are qualified as targets based on the peak amplitude of the detected radar video. The amplitudes are summed together in an adaptive background averager.

The adaptive background average is an adaptative thresholding circuit which uses a moving average of radar return amplitudes formed from the radar returns preceding and following a particular radar return to determine an average background level. To reduce the influence of adjacent radar returns on the average, selected radar returns preceding and succeeding the specific radar return being examined are omitted from the averaging process. It would be readily apparent to one of ordinary skill in the art that a different averaging process could be utilized, e.g., one wherein all preceding and succeeding radar returns are included in the averaging process.

If the examined radar return is greater in amplitude than the computed moving average by a selected amount, the radar return is identified as a possible target and is transferred to the data processor for storage in a scenario map, i.e., a shared memory table, at an address corresponding to the azimuth ($\alpha$)/elevation ($\theta$) coordinates of the point of origin of the examined radar return on the ground navigation grid within the target area T.

If less than a selected number, for example 64, of possible targets are identified in a full 360° azimuthal antenna rotation, the threshold value is lowered to allow more radar returns to be designated as possible targets. If more than the selected number of target candidates are stored, the threshold value is increased to reduce the count on subsequent azimuthal antenna rotations. In this way, fine grain clutter variations are taken into account within a scan.

The result of the operation of the signal processor 95 is the identification of a set of possible targets assembled into an array identified by azimuth/elevation addresses and utilized by the data processor 97 as a target scenario map.

As a further feature of the invention, in the azimuthal processing mode only data from the area surrounding the selected targets in the scenario map is processed by the data processor 97.

The elevation scan rate, which is the number of pulses per radial scan, may be increased, e.g., doubled, after initial target nomination while maintaining the same antenna rotation rate. This increase in elevation scan rate results in target illuminations which are used to refine target position determinations and to analyze target size, geometric distribution, and target behavior, e.g., stationary or moving, in order to prioritize them.

Final target selections and missile assignments are made by the data processor 97 during the azimuthal processing mode. Once the submissiles 31 are assigned to particular targets and launched, the data flow is reduced to signals identifying the position of the submissiles 31 as transmitted by their onboard receivers 55 and data concerning the assigned targets.

Figure 15:
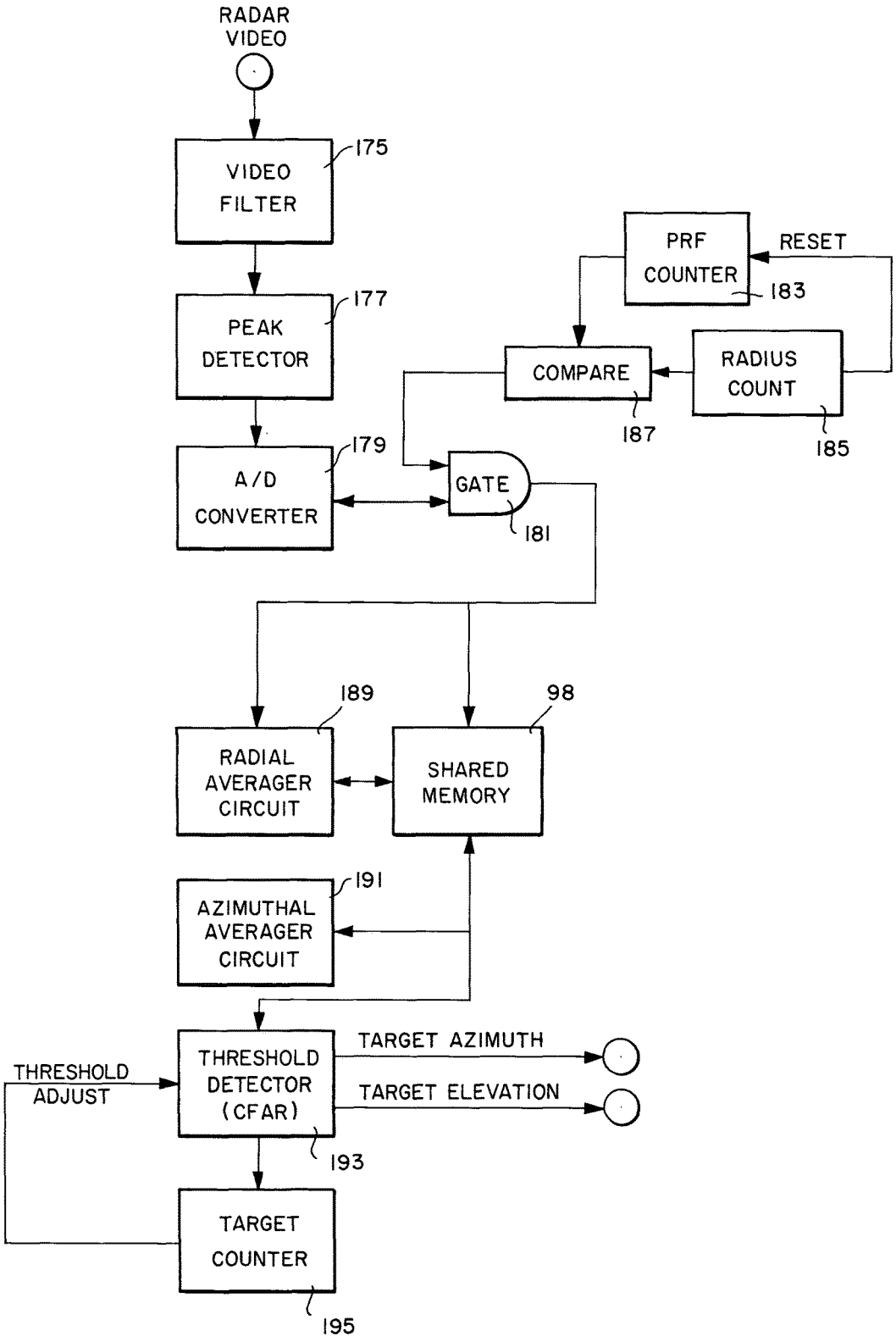
FIG. 15 is a block diagram of the components incorporated in the signal processor of the missile system of the instant invention.

FIG. 15 is a detailed block diagram of the components included within the signal processor 95. A video filter 175 receives the analog signals corresponding to the radar returns from the radar receiver 93 and filters out generally identifiable noise and clutter signals. A suitable video filter 175 comprises a circuit for integrating the received radar returns with respect to time.

The output of the video filter 175 is supplied as an input to a peak detector circuit 177 which modifies the output of the filter 175 to reflect the peak signal value of each radar return.

The output of the peak detector circuit 177 is supplied to an analog-to-digital (A/D) converter 179 which generates a binary value representing the peak value of each signal associated with a radar return. The value of each of the digital signals corresponds to the magnitude of the peak amplitude of the analog signal associated with the radar return.

The output of the A/D converter 179 is supplied as one input to a gate 181. As embodied herein, the gate 181 comprises an AND gate. The other input of the AND gate 181 is a signal corresponding to the results of comparisons of the outputs of a PRF counter 183 and a radius counter 185 by a comparator circuit 187. The function of the PRF counter 183, radius counter 185, and comparator 187 is to enable the AND gate 181 to transfer the digital outputs of the A/D converter 179 selectively to a radial averager circuit 189 and a shared memory 98. This selective gating process enables the signal processor 95 to correct for the large overlap of radar returns along azimuths within the target area T close to the nadir point 141. The selective gating of the outputs of the A/D converter 179 reduces the amount of data that must be processed by the radial averager circuit 189.

The PRF counter 183 receives the outputs of the PRF generator 106 (FIG. 9). As stated above, each output of the PRF generator 106 corresponds to a radar pulse and thus to a radar return. The PRF counter 183 accumulates the number of radar returns received by the radar receiver 93.

The radius counter 185 includes a memory device (not shown) having, for example, 320 storage positions. Each of the storage positions within the radius counter 185 is associated with a different one of the 320 radial scans included within a complete 360° azimuthal scan. Each storage position stores the number of radar returns to be gated into the radial averager circuit 189 by the AND gate 181. As stated above, there are, for example, 200 radar returns included within each radial scan.

For purposes of explanation of radar return gating it will be assumed that in the first radial scan all 200 radar returns are to be processed by the radial averager circuit 189. Accordingly, the first storage location in the radius counter 185 would store the value 200. The comparator 187 compares the contents of the PRF counter 183 to the value 200 stored in the first storage location of the radius counter 185 and supplies a gating signal to gate 181 for each PRF pulse as long as the content of the PRF counter 183 is less than the value 200 as stored in the first storage location of the radius counter 185. When the content of the PRF counter 183 is incremented to 200, the last gating pulse for the first radial scan is supplied by comparator 187 to gate 187 and the PRF counter 183 is reset to zero by the radius counter 185.

The next sequential storage location within the radius counter 185 is accessed and gating signals supplied to gate 181 by comparator 187 as long as the content of the PRF counter 183 is not greater than the value stored in the second storage position of the radius counter 185. To extend the above example, the second storage location within the radius counter 185 may store 180 to enable that number of radar returns to be gated into the shared memory 98 and radial averager circuit 189.

Accordingly, the operation of the PRF counter 183, radius counter 185, and comparator 187 enables the selective gating of all or a selected subset of the radar returns associated with each radial scan to the the radial averager circuit 189 and shared memory 98 by the gate 181. The values as stored in the storage locations of the radius counter 185 control the pattern of radar returns to be supplied to the radial averager circuit 189.

It will be apparent to one of ordinary skill in the art that each bin within the grid of the target area T is uniquely associated with and identified by combination of the count stored in the PRF counter 183 (an elevation value) and an address of a storage location within the radius counter 185 (an azimuth value). As will be discussed below, the combination PRF count and radius count correspond to elevation and azimuth addresses, respectively, and are employed as addresses in the shared memory 98.

Figure 16A:
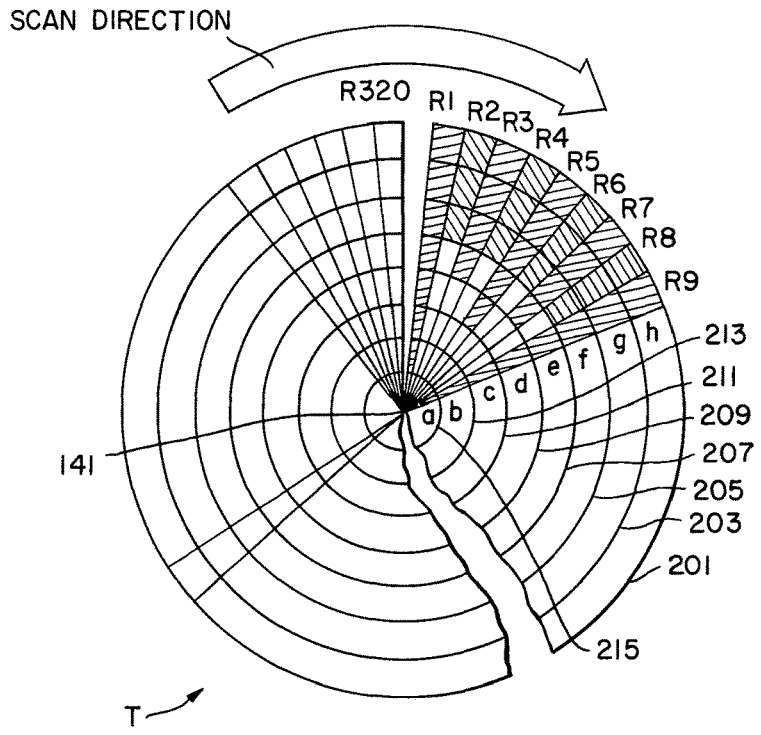
FIGS. 16(a) and 16(b) schematically illustrate the pattern of radar returns employed by the missile system of the instant invention.
Figure 16B:
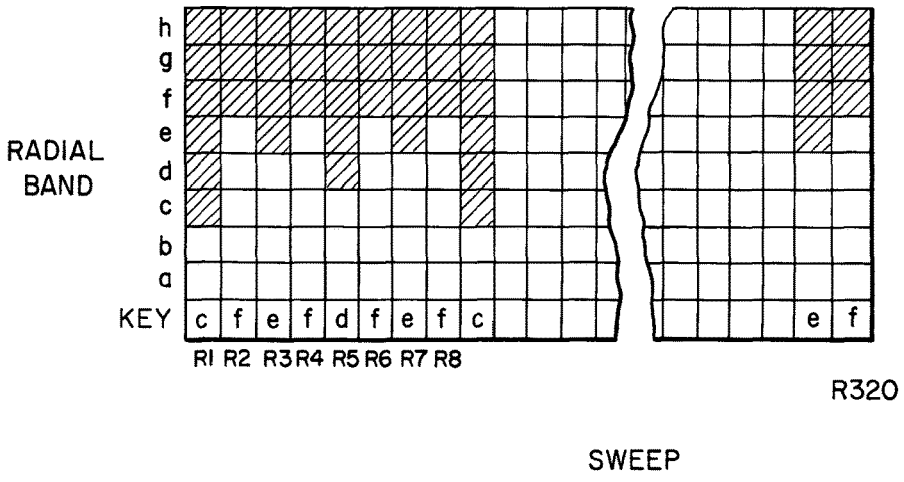

The selective gating as performed by the PRF counter 183, radius counter 185, and comparator 187 will be more readily understood with reference to FIGS. 16(a) and 16(b). As shown in FIG. 16(a), a circular target area T is represented by a series of concentric rings 201, 203, 205, 207, 209, 211, 213, and 215 schematically representing separate azimuthal scans of the target area T and radial scans R1-R320 extending from the nadir point 141 to the outermost azimuthal scan ring 201. Moreover, associated with each of the azimuthal scan rings 201, 203, 205, 207, 209, 211, and 213 are scan depth indicators a-h, respectively. As described above, the pattern of radial scan lines R1-R320 and azimuthal scan rings 201, 203, 205, 207, 209, 211, 213, and 215 define bins associated with specific subareas of the total target area T. The cross-hatched areas of FIG. 16(a) identify those bins within a radial scan whose associated radar returns are to be gated to the radial averager circuit 189 by the gate circuit 181.

The scan pattern grid of FIG. 16(a) is set forth in a tabular form in FIG. 16(b) for ease of understanding. For radial scan R1, the radius counter 185 stores in storage location one the number six corresponding to six bins, c-h, along radial scan R1 which are gated to the radial averager circuit 189. Storage location two of the radius counter 185 stores the value three associated with bins f-h of radial scan R2 indicating that three of the radar returns in radial scan R2 are to be supplied to the radial averager circuit 189.

Similarly, the storage locations three through eight of the radius counter 185 store values representing the number of cross-hatched bins in their associated radial columns as illustrated in FIG. 16(b). The scan pattern, i.e., the number of cross-hatched bins associated with each radial scan, repeats every eighth radial scan so that the pattern as shown in columns R1-R8 of FIG. 16(b) is repeated 40 times for the 320 radial scans included in a complete azimuthal scan of the target area.

It would be apparent to one of ordinary skill in the art that the radius counter 185 need actually include only eight storage locations for storing the values associated with each of the eight radial scans included within the repeating pattern. At the conclusion of the eighth radial scan, the first storage location in radius counter 185 would be reaccessed. Moreover, FIGS. 16(a) and 16(b) illustrate only eight bins (a-h) per radial scan. As described above, 200 or more bins associated with a like number of radar returns are included in a radial scan. If the radius counter 185 includes only eight storage locations then a separate counter (not shown) is provided to maintain a cumulative count of the radius number within an azimuthal scan.

The grids of FIGS. 16(a) and 16(b) relate the number of radar returns per radial scan to be gated into the radial averager circuit 189 by the gate 181. It is readily understood that the gating pattern as illustrated in FIGS. 16(a) and 16(b) reduces the number of radar returns supplied to the radial averager circuit 189 and the shared memory 98 for the azimuthal scans closer to the nadir point 141 than for the radar returns emanating from the portion of the target area T proximate the radial boundary of the target area T. For azimuthal scans near the periphery of the target area T, all radar returns are gated into the radial averager circuit 189 by the gate 181. This gating subsystem provides the ability to standardize the amount of overlap of radar returns within the scanned target area T throughout each radial and azimuthal scan.

The output of the gate 181 is coupled as an input to the shared memory 98 wherein the gated radar returns are stored at associated azimuth/elevation addresses.

Figure 17A:
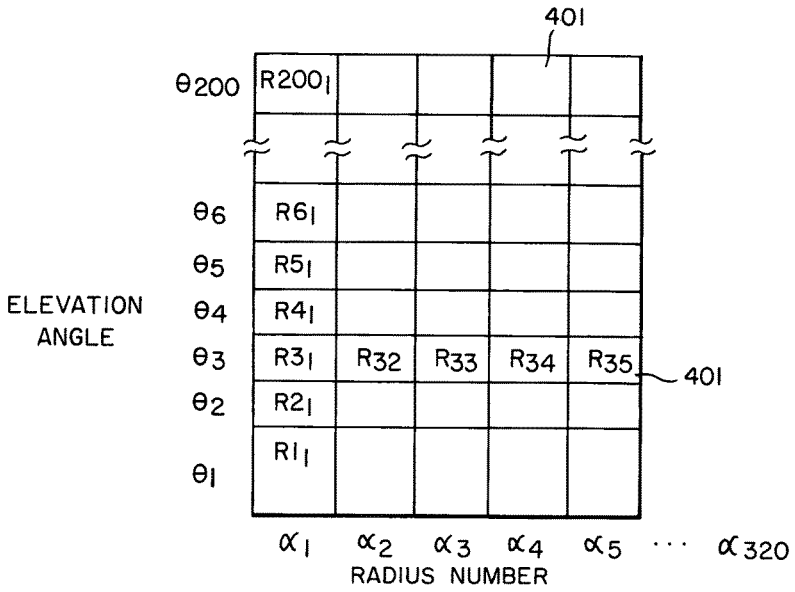
FIG. 17(a) schematically illustrates a shared memory accessed by the signal processor and data processor of FIG. 15.

FIG. 17(a) schematically illustrates the storage organization of the shared memory 98. As shown in FIG. 17(a), a set of coordinates are supplied for each data bin associated with the radar returns generated from the target area T. The bins 401 have stored therein the digitized values corresponding to the amplitude peaks of the radar returns having amplitudes above a selected threshold. The memory 98 is addressed by a combination of radius number $\alpha$ and elevation angle $\theta$. As illustrated in FIG. 17(a), the first column of the memory 98 stores the binary values associated with the elevation angles ($\theta_1$-$\theta_{200}$) for the first radial scan of the target area T.

Referring again to FIG. 15, the shared memory 98 is coupled to a radial averager circuit 189, an azimuthal averager circuit 191, and a threshold detector (CFAR) 193. A target counter 195 is connected to the output of the threshold detector 193 and supplies a threshold adjust signal (THADJ) as an input signal to the threshold detector 193. Two additional outputs of the threshold detector 193 include coordinate azimuth ($\alpha$) and coordinate elevation ($\theta$) terminals.

In operation, the radial averager circuit 189 computes the average of the amplitudes of a selected radar return pulse and a select number of its preceding and succeeding pulses and outputs an average of this series. It is a function of the radial averager circuit 189 to average the amplitudes of the radar return pulses along an elevation in a scan pattern.

The azimuthal averager circuit 191 averages the amplitudes of the radar return pulses in a cross-radial direction, i.e., a series of pulses along an azimuth in the scan pattern. The shared memory 98 is updated with the results of the radial and cross-radial averaging.

The threshold detector 193 accesses the radially and cross-radially averaged return pulses, as stored in the shared memory 98, and outputs the azimuth and elevation coordinates associated with each pulse having an averaged signal value above a predetermined threshold. The target counter 195 is incremented by 1 for every set of azimuth/elevation coordinates outputted by the threshold detector 193 during an azimuthal scan. If fewer than a preselected number of sets of azimuth/elevation coordinates are outputted by the threshold detector 193 during a complete azimuthal scan, the target counter 195 generates a threshold adjust signal that will lower the threshold level to increase the number of sets of azimuth/elevation coordinates that will be outputted by the threshold detector 193. Conversely, if greater than a preselected number of azimuth/elevation coordinates are outputted by the threshold detector 193, the target counter 195 raises the value of the threshold adjust signal to decrease the number of coordinates outputted by the threshold detector 193.

The radial averager circuit 189 receives the digital values of the radar return pulses $R\alpha_i,\theta_i$ from the gate 181 (FIG. 15) and generates a moving average of the values of those pulses, $R\alpha_i\overline{\theta}_i$. The average values as outputted by the radial averager circuit 189 are stored in the memory locations of the shared memory 98 at storage locations corresponding to the coordinates $\alpha$, $\theta$. The azimuthal averager circuit 191 accesses the radially averaged radar return pulses, $R\theta_i$, $\overline{\theta}_i$. The azimuthal averager circuit 191 performs cross-radial averaging to generate the values $R\overline{\alpha}_i$, $\overline{\theta}_i$ which are stored in the shared memory 98 at the corresponding locations, $\alpha$, $\theta$.

Figure 17B:
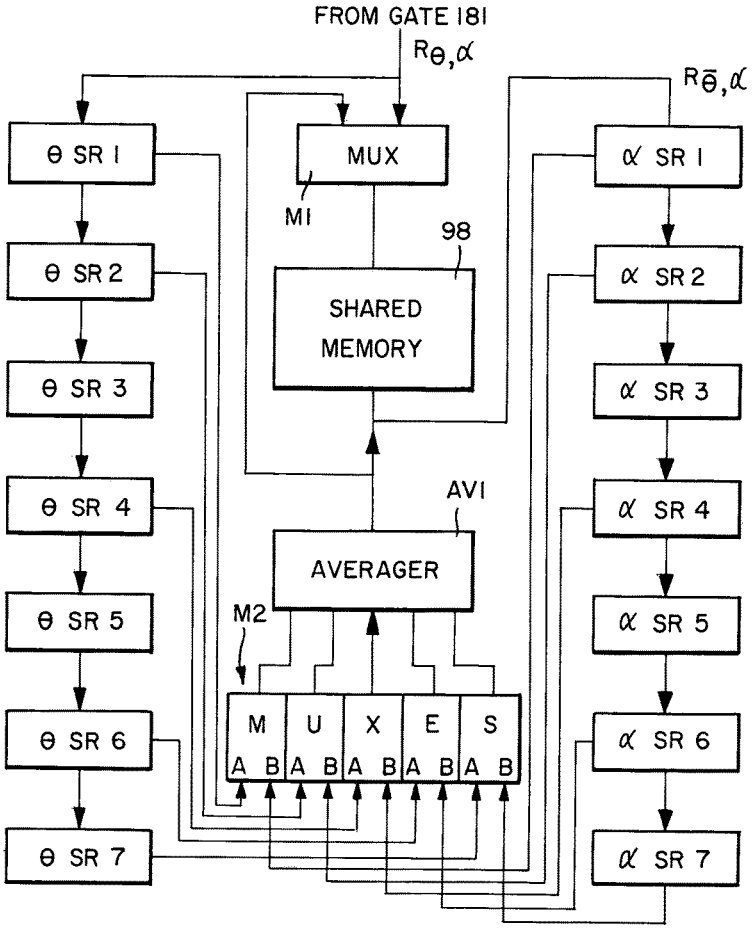
FIG. 17(b) illustrates an embodiment for the radial averager circuit and azimuthal averager circuit utilized in the signal processor of FIG. 15.

FIG. 17(b) illustrates a more detailed embodiment of the radial averager circuit 189 and the azimuthal averager circuit 191. The radial averager circuit 189 comprises, for example, seven shift registers, θSR1-θSR7, connected in series between the output ($R\alpha$, $\theta$) of the AND gate 181 (FIG. 15) and the A inputs of multiplexers M2. The shift register θSR4 stores the digital value of the radar return pulse being averaged in a radial direction. The digital values of the next preceding and succeeding radar return pulses as stored in θSR5 and θSR3, respectively, are not connected to any of the multiplexers M2 to prevent the signal values of the preceding and succeeding radar return pulses from influencing the average being computed for the radar return pulse being considered, i.e., the radar return pulse stored in shift register θSR4.

During the radial averaging process, the A inputs of the multiplexers are selected and supplied as inputs to the averager AV1. In this instance, the averager AV1 sums the digital representations stored in shift registers θSR1, θSR2, θ, θSR6, and θSR7 and divides the sum by five. This produces the value $R\alpha_i$, $\overline{\theta}_i$ to be associated with the radar return pulse stored in the shift register θSR4. This average value is supplied by multiplexer M1 to the storage location in the shared memory 98 corresponding to the azimuth/elevation coordinates associated with the digital representation stored in the shift register θSR4.

The next radial averaging step is performed by shifting in cascade the digital representations stored in the shift registers θSR1-θSR7. The value previously stored in shift register θSR7 is discarded and the digital representation of the next successive radar return pulse in the radius being averaged is entered into the shift register θSR1. Such processing continues until all of the radar pulses in a particular radius (elevation) have been averaged and the averages stored in the appropriate storage locations of the shared memory 98.

The azimuthal averager circuit 191 comprises shift registers αSR1-αSR7 also connected in cascade. The shift registers αSR1, αSR2, αSR4, αSR6, and αSR7 are connected to the B inputs of the multiplexers M2. The successive inputs to the first shift register αSR1 comprise the radially averaged radar return pulses $R\alpha_i$, $\overline{\theta}_i$.

During azimuthal averaging, the multiplexers M2 select the B inputs and supply those inputs to the averager AV1. The averager AV1 sums the values of the digital representations stored in the shift registers αSR1, αSR2, αSR4, αSR6, and αSR7 and divides the sum by five. The resulting value corresponds to the radially and azimuthally averaged values $R\overline{\alpha}_i$, $\overline{\theta}_i$ associated with the radar return pulse stored in shift register αSR4. The output of the averager AV1 is selected by multiplexer M1 and stored in storage locations of the shared memory 98 corresponding to the azimuth/elevation coordinates associated with the digital representation of the radar return pulse stored in shift register αSR4. These processing steps continue until all of the radially averaged radar return pulses have also been averaged in a cross-radial direction. Moreover, the radial and cross-radial averaging is performed for each azimuthal scan of the target area during the target identification phase of the main missile 11.

It will be understood, that after radial and cross-radial averaging of the radar return pulses stored in the shared memory 98, the original values $R\alpha_i$, $\theta_i$ are replaced by the averaged values $R\overline{\alpha}_i$, $\overline{\theta}_i$.

Referring again to FIG. 15, the threshold detector 193 accesses the radially and cross-radially averaged radar returns and compares the digital representation of each fully averaged radar return against the digital values of neighboring radar returns. If the value of the examined radar return exceeds the values of neighboring radar returns by a specified threshold amount, then the azimuth/elevation coordinates of the examined radar return are supplied as outputs to the data processor. At the same time, the value stored in the target counter 195 is incremented by 1. This process continues until all radar returns have been compared to their neighbors. As stated above, if during the processing of a complete azimuthal scan fewer or more than a preselected number of azimuth/elevation coordinates are outputted to the data processor, the threshold adjust signal (THADJ) is supplied by the target counter 195 to the threshold detector 193 to vary the level of the threshold appropriately. A suitable threshold detector (CFAR) is disclosed in Skolnik, Introduction to Radar Systems, McGraw-Hill (1980), section 10.8, pp. 392-95.

7. Data Processor

The functions of the data processor 97 include storing the azimuth/evaluation coordinates outputted by the threshold detector 193 in the target table 100 and evaluating the signal values of the radar returns associated with the stored coordinates to identify and select those targets with the strongest signatures.

FIG. 18 illustrates processes for performing such target identification processing. As illustrated in FIG. 18, amplitude, cluster, linearity, and pattern testing are performed by the processor 97 on the averaged radar return values stored in the shared memory 98 at the coordinates outputted by the threshold detector 193. As stated above each of the 64 sets of target coordinates is stored in the target table 100. After each identification procedure, each set of coordinates is assigned a score associated with the results of target discrimination testing. The scores are cumulatively maintained in the target table 100 as seen from FIG. 18.

As an example, the data processor 97, under program control, accesses the first set of coordinates stored in the target table 100. The accessed target coordinates are employed to access the radar return value stored in the shared memory 98 at a storage location also addressed by that set of azimuth/elevation coordinates. Upon accessing the radar return value, the data processor 97 performs amplitude testing on the radar return value and assigns a score to the coordinates thereof according to the amplitude of the signal associated therewith. According to the preferred embodiment, the higher the amplitude of the radar return associated with the coordinates thereof, the greater the score attributed thereto.

A cluster test is also performed on target number one. This comprises examining the sets of $\alpha/\theta$ coordinates stored within the target table 100 for closely adjacent coordinates. If there are adjacent sets of coordinates, an appropriate addition is made to the scores associated with the adjacent sets of coordinates.

A linearity test is performed on the azimuth/elevation coordinates stored within the target table. As discussed above with regard to FIGS. 3 and 4, possible missions for the instant missile system include attacks against airfields and against armored vehicles proceeding along a road. If the data processor 97 determines that a series of coordinates in the target table 100 are linearly aligned and closely spaced, then the probability exists that an airfield or a road lies within the target area T. For each such determination, an increase in score of the linearly aligned targets is effected by the data processor 97 by adding to the appropriate values in the target table 100.

The last illustrated target discrimination test is a pattern test. Included within the main missile 11 is a pattern library memory 104 coupled to the data processor 97. In this test, the spatial relationships of the sets of azimuth/elevation coordinates in the target table 100 are compared to patterns of targets which are stored within the pattern library 104. The scores associated with any sets of coordinates in the target table 100 are appropriately adjusted if a target pattern is identified. An example of a target that would have a distinct pattern is a stationary surface-to-air missile installation.

It will be understood by one of ordinary skill in the pattern recognition art that the azimuth/elevation coordinates stored in the target table 100 and the radar return values associated therewith could be subjected to different pattern identification tests in order to accumulate score values. It is contemplated herein that the higher the score value the more probable it is that the corresponding azimuth/elevation coordinates reflect the location of a target for a submissile.

As illustrated in FIG. 18, the target table 100 includes 64 storage locations with each storage location including fields for storing the cumulative score and the azimuth/elevation coordinates.

Following the target identification procedures, the entries in the target table 100 are sorted by the data processor 97 into score order and a plurality of the highest score ranking coordinates equal in number to the number of submissiles 31 carried by the main missile 11 are stored in the sorted target identification table 100A. Thus, if eight submissiles 31 are carried by the main missile 11 then the eight highest ranking (on the basis of cumulative score) entries in the target table 100 are stored in the sorted target table 100A.

A further function of the data processor 97 is to compensate for wind drift of the main missile 11 as it descends toward the target area T suspended from the drag chute 21. The inertial navigation system 101 determines the direction in azimuth/elevation coordinates of the drift of the main missile 11 and also the velocity of the drift. Appropriate digital signals representing these two conditions are supplied to the data processor 97. The data processor 97 utilizes the wind drift information supplied by the inertial navigational system 101 to ensure that changes in target characteristics are posted to the proper azimuth/elevation coordinate address in the shared memory 98. Accordingly, if an identified target is stationary, the data processor will update its originally associated storage location in the shared memory 98 despite the wind drift of the main missile 11. Moreover, if an identified target is actually moving, the data processor 97 will store the information associated with the moving target in its proper location in the shared memory 98 to reflect such target movement properly.

Figure 19:
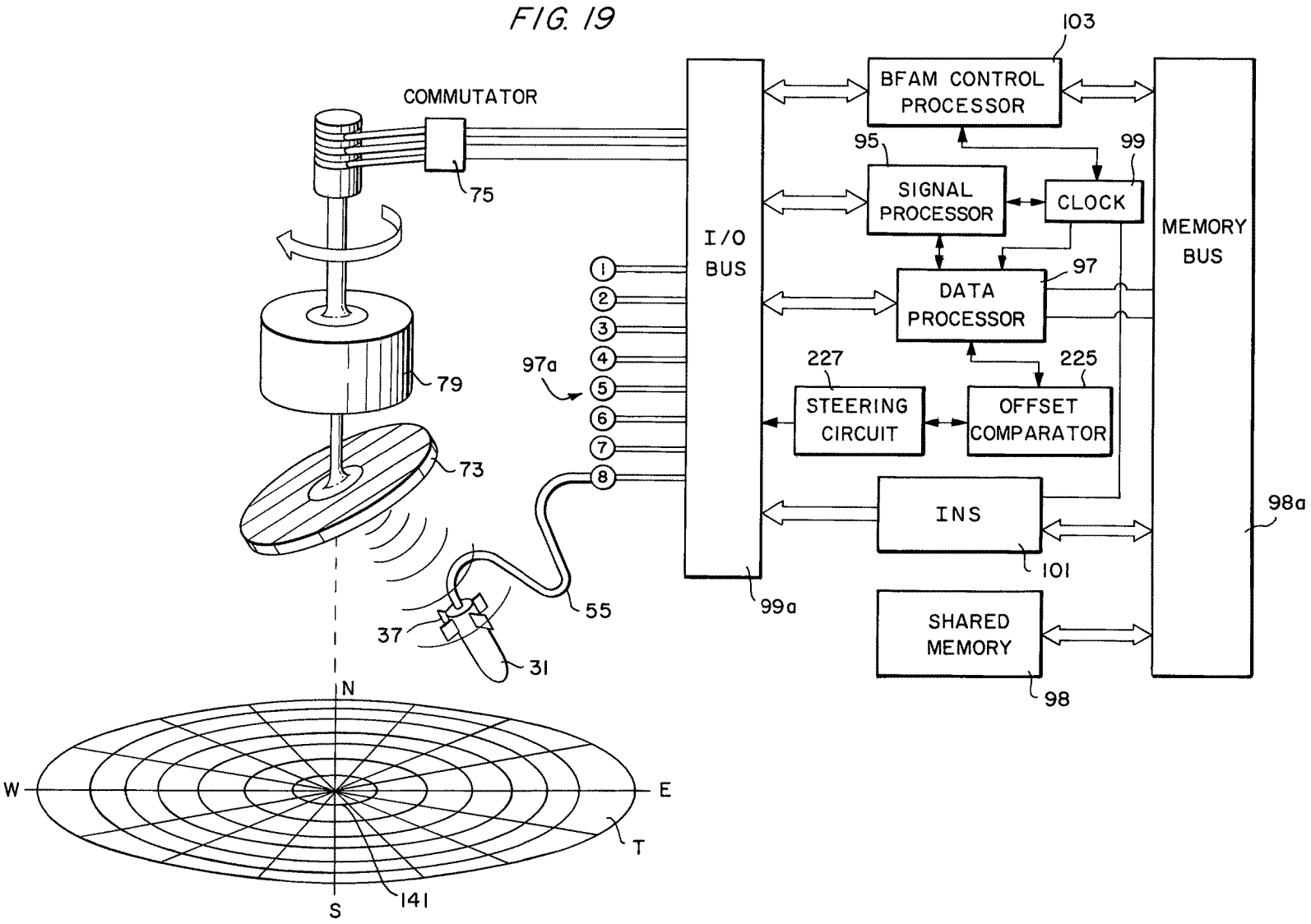
FIG. 19 illustrates a functional embodiment of the missile sensor data processing system of the instant invention.

As shown in FIG. 19, the target area T is schematically divided into a ground navigation grid (with azimuth/elevation coordinates), as described with reference to FIGS. 7(b) and 7(c). In the case of a circular target area, a series of radial scan lines emanate from the nadir point 141 and a plurality of azimuthal scan rings lie concentrically with the nadir point 141. The antenna drive mechanism 77 rotates the antenna 73, and the radar electronics 79 (including the radar transmitter 91 and radar receiver 93) as a single unit. The inertial navigation system 101 and the clock 99 provide the basic data to control the beam control processor 103 to cause the antenna 73 to scan the target area T. The radar returns from the target area T are supplied to the signal processor 95 for filtering, peak detection, and thresholding. The outputs of the signal processor 95 are supplied to the shared memory 98 via the data processor 97 and the memory bus 98a. In accordance with the description relating to FIGS. 15 and 18, after the radar return information is written into the shared memory 98 and the target table 100, the data processor 97 accesses the information to perform target evaluation and selection in accordance with the scoring technique described above.

Following target identification and missile assignment (as discussed below) by the data processor 97, the submissiles 31 are launched. The submissiles 31 pass through the radar scan of the target area T as they fly toward their assigned targets causing position information to be written into appropriate storage locations in the shared memory 98 by means of the submissile ports 97a, I/O bus 99a, and the data processor 97. This position information is generated by the receiver 57 included in the tail of each submissile 31 and, as described above, includes in the case of radar the frequency of the radar beam which was sensed by the receiver 57. This frequency information enables the data processor 97 to resolve the locations of the submissiles 31 and to store that data in the shared memory 98.

The missile system of the instant invention further includes a submissile offset comparator 225 and a submissile steering circuit 227. The submissile offset comparator 225 compares the instantaneous position of the submissile with respect to the assigned target and generates appropriate correction signals to direct, each of the submissiles 31 toward its assigned targets. The steering circuit 227 transmits appropriate control signals to the individual submissiles 31 through the I/O bus 99a and submissile ports 97a. Submissile guidance will be discussed below in greater detail.

Figure 20A:
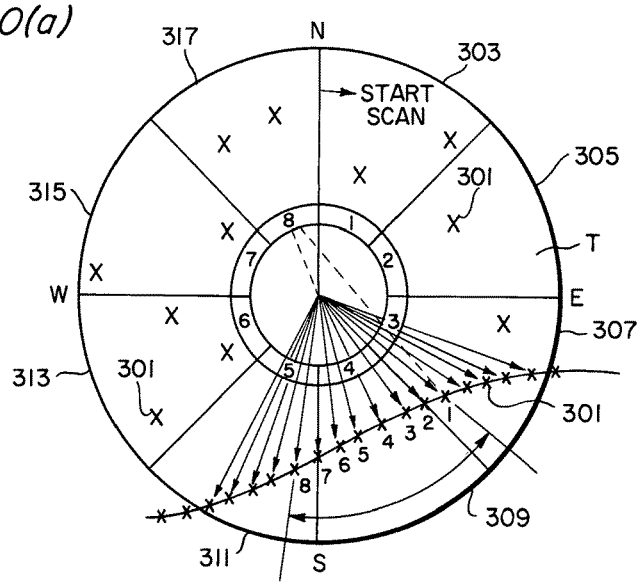
FIGS. 20(a) and 20(b) set forth an embodiment of submissile assignment procedures for the missile system of the instant invention.
Figure 20B:
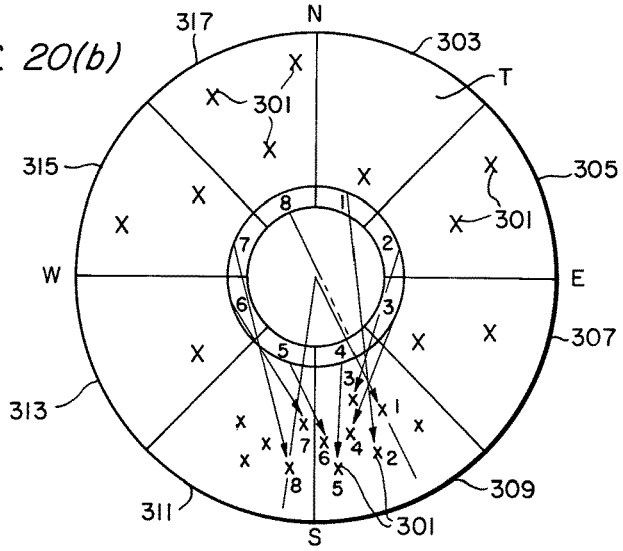

FIGS. 20(a) and 20(b) schematically illustrate a procedure for assigning submissiles 31 to specific targets identified within the target area T. As described above, the data processor 97 performs a series of target discrimination tests on the target data stored in a shared memory 98 and assigns scores to the targets in accordance with the results of the test. The data processor 97 stores the target information as entries in the target table 100.

After creating the target table 100, the data processor 97 optionally performs one additional sequence of tests on the identified targets before assigning the submissiles 31 to specific targets. This last process is illustrated in FIGS. 20(a) and 20(b).

Referring to FIG. 20(a) a plurality of targets 301 are illustrated against the azimuth/elevation navigational grid superimposed on the target area T. The target area is considered to comprise eight segments 303, 305, 307, 309, 311, 313, 315, and 317 with each segment being associated with a different one of submissiles one through eight, respectively, carried by the main missile 11. The purpose of the missile assignment procedure is to select eight targets within the target area T and to assign to each of the targets a different one of the eight submissiles 31. Since in the preferred embodiment, the submissiles 31 are connected to the main missile 11 via a hardwire link 55, the data processor 97 assigns the submissiles 31 to the targets 301 in a manner to minimize the possibility of entanglement of the hardwire links 55.

As the main missile 11 descends toward the target area T, a continuous scan of the target area T is performed. During each scan of the target area T, the signal processor 95 processes the radar returns and updates the entries in the shared memory 98 via the data processor 97 in the manner described above. The data processor 97 continually performs target selection and missile assignment processing on the entries in the shared memory 98 and the target table 100 until the time that the submissiles 31 are to be launched. As explained above, when an azimuthal scan of the target area T is performed, the existence of the targets 301 is determined and their locations are stored in the shared memory 98 according to unique azimuth/elevation addresses.

At the same time that an azimuthal scan is started, the data processor 97 commences the operation of a timer. Whenever a target is identified, a value representing the time elapsed from the start of the azimuthal scan is stored in a field of the storage location in the target table 100 associated with the azimuth/elevation coordinates of the just-scanned target. The elapsed time from the start of each azimuthal scan to the scan of each successive set of coordinates in the target table 100 is measured and stored by the data processor 97 throughout consecutive 360° azimuthal scans.

At the end of a complete azimuthal scan, the minimum cumulative time for scanning the number of successive targets equal to the number of submissiles is selected and the targets within the selected group are designated as the final set of targets to be assigned submissiles 31.

This cumulative time processing procedure is repeated continuously until the main missile 11 descends to the firing altitude, e.g., 1 kilometer. At that time, the eight most closely spaced targets as determined at the end of the last 360° azimuthal scan by the minimum elapsed cumulative time are selected as the final set of targets for assignment of the submissiles 31.

Submissile assignment, as stated above, is effected in a manner to minimize the possibility of entanglement of the hardwire links 55. To this end, the submissile 31 closest to a 180° azimuth displacement from the fourth target in the finally selected group of eight targets is assigned to the first of the finally selected targets. Consecutive targets are assigned to successive submissiles 31 in sequence in the same direction as which the radar scans the target area T.

Referring again to FIG. 20(a), upon completion of the target assignment procedure, targets one through eight within segments 307 and 309 have been determined from the elapsed time analysis to be the most closely spaced. Target four (the middle target in the succession of selected targets) in segment 309 is approximately 180° azimuthally offset from submissile eight. Accordingly, data processor 97 assigns submissile eight to the first selected target, i.e., target one, in segment 307. Continuing clockwise in the submissile assignment procedure, submissiles one through seven are assigned to targets two through eight, respectively. As seen from the final selection of targets one through eight in segments 307 and 309, the target pattern selected was substantially linear. This target assignment procedure reduces the probability that the trajectories of the submissiles will cross and, therefore, avoids entanglement of the communication links 55.

FIG. 20(b) is an example of submissile assignment for a non-linear cluster of targets. As seen from FIG. 20(b), the eight most closely grouped targets reside within grid segments 309 and 311 of the target area T. Submissile eight is shown to be approximately 180° azimuthally disposed from the middle target, i.e., target four, and, according to the above-described submissile assignment procedure, submissile eight is assigned by the data processor 97 to the first of the selected targets, i.e., target one. As was the situation illustrated in FIG. 20(a), submissiles one through seven are assigned to targets two through eight, respectively.

It will be apparent to one of ordinary skill in the art that the principles of the above-described missile assignment procedure apply equally for main missiles having other than eight submissiles.

It is also contemplated that criteria other than target proximity may be utilized for submissile assignment. For instance, targets may be assigned to the submissiles by the programmed-controlled data processor 97 solely on the basis of cumulative score ranking within the sorted target table 100A as discussed above.

Figure 21:
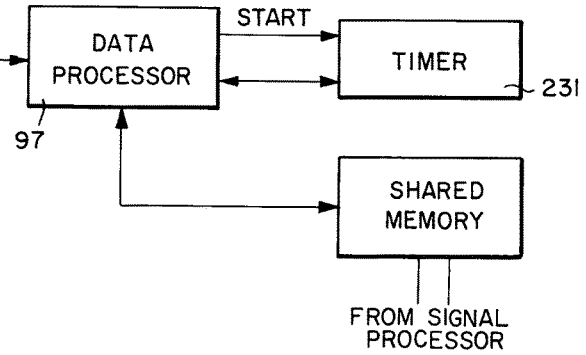
FIG. 21 is a block diagram illustrating the submissile assignment table of the missile system of the instant invention.

FIG. 21 illustrates an embodiment of the missile system suitable for the missile assignment procedure described with regard to FIGS. 20(a) and 20(b). The data processor 97 is connected to a timer 231. The timer 231 continuously outputs the time, for instance in milliseconds, following receipt of a start azimuthal sweep signal (SAS) from the data processor 97. The data processor 97 processes the entries in the target table 100 which are stored in target number order. As the signal processor 95 updates an entry in the shared memory 98 associated with a target in the target table 100 indicating the scan of that target, the data processor 97 also enters the elapsed time from the timer 231 into the time storage location associated with that target in the target table 100. This elapsed time updating is performed for every entry in the target table 100 which, for purposes of the example, is understood to be 64 entries.

At the time for final submissile assignment, the data processor 97 under the control of a suitable program accesses the entries in the target table 100, selects the eight most closely spaced targets, and assigns submissiles in accordance with the above-described procedure.

8. Submissile Guidance

Following launch of the submissiles, guidance thereof is performed primarily by the data processor 97, offset comparator 225, and steering circuit 227. The guidance of each of these submissiles is divided into two stages. The first stage is called the predictive guidance or "gathering" phase and the second phase is called the command guidance or "tracking" phase. In the gathering phase, each submissile follows a preprogrammed flight path for a predetermined time period, e.g., ½ of the total flight time of the submissile. The preprogrammed flight path is determined at the time of submissile launch and is a function of the initial offset angle between the submissile and its assigned target. The preprogrammed flight path is designed to reduce the offset angle between the submissile and its assigned target relative to the main missile to zero by the time the gathering phase has been completed. This is accomplished by supplying to the submissile a command indicating the number of side G's (Gs) in the azimuthal and elevational directions to be pulled during the gathering phase.

Subsequently, in the tracking phase, the data processor supplies to the offset comparator 225 the coordinates $M_i(\alpha, \theta)$ and $T_i(\alpha, \theta)$ ($1 \leq i \leq$number of submissiles) of a submissile 31 and its assigned target, respectively. The offset comparator 225 outputs a correction angle for the submissile $\Delta M_i(\alpha, \theta)$ which is decoded into the G's to be pulled in the azimuthal and elevational directions by the submissile 31. The steering circuit 227 supplies commands to the submissile autopilot 255 (FIG. 25) for achieving the required Ws in the desired direction. These commands are transmitted via the submissile ports 97a, the I/O bus 99a, and the transmission links 55.

Figure 22:
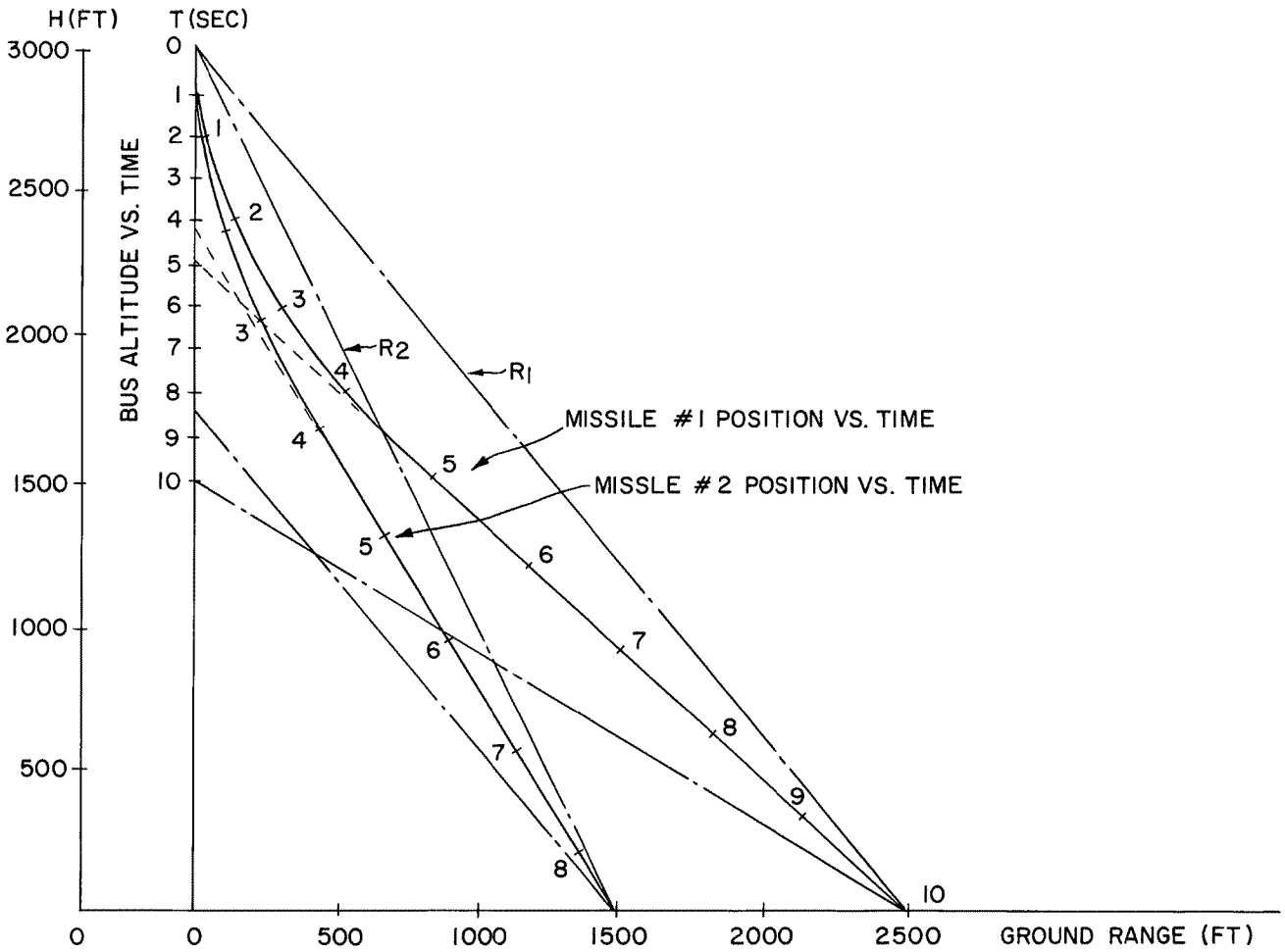
FIG. 22 is a graphic illustration of the flight geometry of two submissiles relative to the main missile of the instant invention as the submissiles fly toward assigned targets.

The flight paths of submissiles 1 and 2 with respect to time are graphed in FIG. 22. Submissiles 1 and 2 are launched at an altitude of 3,000 feet at individually assigned targets located 2500 feet and 1500 feet from the nadir point, respectively. The flight time of submissile 1 is ten seconds with the first five seconds constituting the gathering phase and the second five seconds constituting the tracking phase. The flight time of submissile 2 is approximately 8.5 seconds with the first 4.25 seconds being the gathering phase and the last 4.25 seconds being the tracking phase.

During the gathering phase, the position relative to the main missile 11 of submissile 1 changes from a large offset angle with regard to its assigned target to a position substantially in line with the assigned target. Similarly, during the first 4.5 seconds of flight, submissile 2 decreases its angular offset with regard to its assigned target until at the end of the gathering phase it is substantially in line with its assigned target.

FIG. 23 illustrates in a tabular manner the side maneuvers commanded to the submissiles 1 and 2 during the gathering phase and the resulting reduction in offset angle. The gathering phase for submissile 1 extends for the first five seconds of flight towards its assigned target. The gathering phase for submissile 2 comprises the first 4.5 seconds of its flight towards its assigned target. As shown in FIG. 23 in the 1st second following launch, submissile 1 is −36° offset in elevation (θ) with respect to its assigned target and is traveling at a velocity of 300 feet/second. A correction force of 2G's (two side G's) in elevation is supplied to submissile 1 by the steering circuit 227. Submissile 2 is similarly traveling 300 feet/second and is to undergo a 1.7 G's correction force in elevation to correct its −25° offset. The elevational offset for submissile 1 decreases during the gathering phase from −36° to 0° in elevation. For submissile 2 the elevational offset decreases from −25° to −1° during the gathering phase.

During the tracking phase for both submissiles 1 and 2 of the example, small G-maneuvers are commanded to the submissiles to correct the small offset angles relative to the small bias angles as shown in FIG. 23. For submissile 1, these bias angles reach a maximum of 2.5° whereas for submissile 2 they remain constant at 1°.

Figure 24:
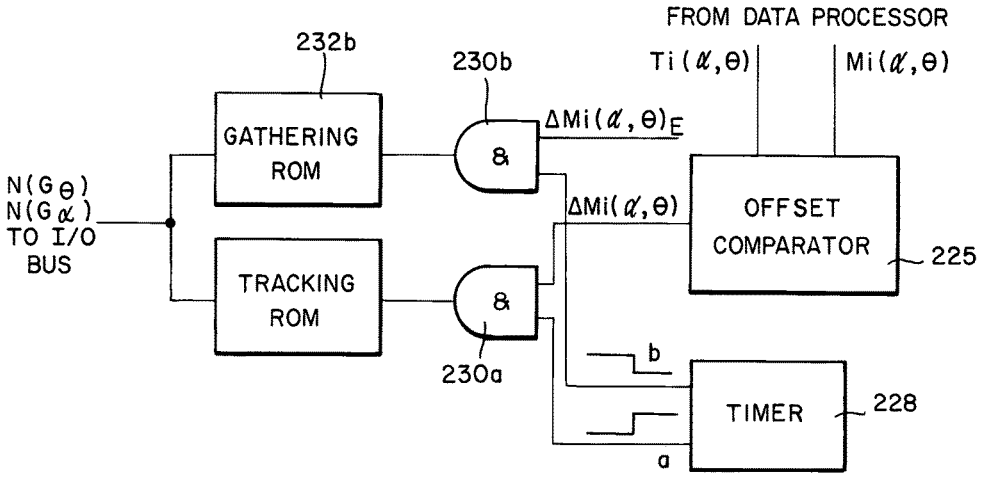
FIG. 24 schematically illustrates an embodiment of the submissile offset comparator and submissile steering circuit of FIG. 19.

FIG. 24 illustrates an embodiment of the offset comparator 225 and the steering circuit 227. The offset comparator 225 receives the coordinates of the target $T_i(\alpha, \theta)$ and its assigned missile $M_i(\alpha, \theta)$ from the data processor. The offset comparator generates the offset angle of the submissile, $\Delta M_i(\alpha, \theta)$ and supplies it to one input terminal of an AND gate 230a. A second AND gate 230b receives at one input terminal an estimated missile correction signal $\Delta M_i(\alpha, \theta)_E$ corresponding to the number of side G's (N(Gs)) to be applied to the submissile during the gathering phase.

The other inputs to the AND gates 230a and 230b comprise the outputs a and b of a timer circuit 228. The b output is high and the a output low throughout the gathering phase of each submissile. The timer 228 produces the a output high and the b output low during the tracking phase of each submissile. Accordingly, the AND gate 230a is disabled during the gathering phase of each submissile whereas AND gate 230b is enabled during the gathering phase of each submissile.

The output of the AND gate 230b, $\Delta M_i(\alpha, \theta)_E$ addresses a gathering ROM 232b. Stored within the gathering ROM 232b are values $N(Gs\alpha_i)$ and $N(Gs\theta_i)$ corresponding to the possible programmed values of $\Delta M_i(\alpha, \theta)_E$ As an example, $\Delta M_1(\alpha, \theta)_E$ is −36° for submissile 1. For this initial elevational offset for submissile 1, gathering ROM 232b outputs $N(Gs\theta_i)$ equal to 2 throughout the gathering phase of the flight of submissile 1. For submissile 2, $\Delta M_2(\alpha, \theta)_E$ is −25° and the gathering ROM 232b outputs $N(Gs\theta_i)$ equal to 1.7 throughout the gathering phase of the flight of submissile 2.

The concept of a flight gathering phase is well known as evidenced by the ROLAND short range air defense missile system. The previously referenced TOW wire-guided missile is an example of a missile control system wherein the flight of the missile is controlled by instructing the submissile to pull side G's to correct the small angular offsets between the missile and its assigned target as in the tracking phase of the instant invention. It will be apparent to one of ordinary skill in the art that the ROLAND and TOW systems can be modified to operate in the missile system of the instant invention.

It will be further apparent that the data processor 97 can be programmed to calculate the $\Delta M_t(\alpha, \theta)$ vectors and N(Gs) to guide each submissile on a nominal collision course with its assigned target without departing from the principles described above. In such an embodiment, each submissile is guided by the vectors for roughly ½ of the estimated flight time of the missiles along the predicted bus-to-target line-of-sight. During the tracking phase, the data processor 97, or alternatively the offset comparator 227 and the steering circuit 229, generates up-down commands proportional to the elevational error of the submissile relative to the predicted elevation of its assigned target and left-right commands proportional to azimuthal offsets of the submissile from the predicted azimuthal location of its assigned target.

9. Submissile Terminal Guidance

Although not a specific feature of the instant invention, typical general requirements for submissile terminal guidance, i.e., submissile homing, will now be discussed. The nominal hand-over condition from main missile guidance control to submissile terminal guidance occurs at target time-to-go of two seconds and a range-to-go of 750-900 feet. The corresponding submissile maneuver capability is in the order of 3-4 G's and a submissile short-period response of 0.1-0.2 seconds. The terminal seeker or homer on the submissile includes a guidance filter time constant of 0.2-0.3 seconds, a seeker field of view of 16° total, seeker resolution of 4-5 mils., and a sample rate greater than 20 samples per second.

The terminal homing device may comprise a charge coupled device array which transmits signals representing its field of view to the main missile 11 via the link 55 whereby the main missile 11 guides the submissile 31 to impact. This type of guidance is known as track-via-submissile and is similar to that employed by the Patriot air defense missile system.

An alternative to track-via-submissile guidance is autonomous submissile terminal homing as employed by the Sidewinder and Stinger missiles. It would be readily apparent to one of ordinary skill in the art, that the principles employed in the homing devices of the Sidewinder and Stinger missiles can be readily integrated into the submissiles of the missile system of the instant invention.

FIG. 25 is a cross section of a submissile 31 usable with the missile system of the instant invention. The submissile 31 includes a means for viewing the target area and for receiving, at short range, radiant energy emitted by the target. As embodied herein the short range viewing means comprises a terminal homing device 61 including an array of radiant energy detectors $S_1$-$S_5$. The detector $S_1$ is aligned along the boresight of the submissile 31. The sensors $S_2$-$S_5$ are positioned on each side of the sensor $S_1$ and each provides a limited field of view displaced from the submissile boresight by known angular increments. Accordingly, if the target T is within the field of view of sensor $S_5$ as illustrated in FIG. 25, the angular displacement of the target from the boresight of the submissile 31 is easily determinable.

The detectors $S_1$-$S_5$ are coupled to means for processing the output signals of the short range viewing means and for controlling the flight of the submissile to home on the assigned target responsive to the processed output signals. As embodied herein in a pursuit guidance application, the processing and controlling means comprises an autopilot 255 coupled to the detectors $S_1$-$S_5$ and responsive to the outputs thereof to maintain the assigned target in the field of view of the boresight detector $S_1$.

Alternatively, in track-via-submissile implementation the outputs of the detectors $S_1$-$S_5$ are transmitted directly to the main missile 11 via the communication links 55 to enable the guiding means of the main missile 11, i.e., the data processor 97, offset comparator 225, and steering circuit 227, to guide the submissile 31 to its assigned target. As embodied herein, the transmitting means comprises a transmitter 257 coupled to the detectors $S_1$-$S_5$, to the autopilot 255, and to the spectral sensitive receiver 57 provided in the tail of the submissile 31. Included within the transmitter 257 is either an optical or an electrical signal transceiver depending upon the nature of the communication link 55. The autopilot 255 controls the flight of the submissile 31 in the track-via-submissile mode in response to the outputs of the steering circuit 229.

It will be further apparent to those skilled in the art, that various modifications and variations can be made to the missile system of the instant invention without departing from the scope or spirit of the invention and it is intended that the present invention cover the modifications and variations of the system provided that they come within the scope of the appended claims and their equivalents.

What is claimed is:

1. A missile system comprising:

a missile carrier deliverable to a position overlying a target area;

a plurality of missiles carried by said missile carrier, said missile carrier including:

means for locating targets within the target area as said missile carrier descends toward the target area;

means for determining [the most closely spaced] *a* subset of said identified targets equal in number to the plurality of missiles carried by said missile carrier;

means for individually assigning said missiles to each of said targets in said subset in a manner to [minimize] *reduce* the likelihood of the trajectories of said missiles interfering with each other;

means for launching said missiles against said assigned targets; and means responsive to said launching of said missiles for guiding said launched missiles substantially through the entire flights thereof from said missile carrier to said assigned targets[as the missile carrier continues to descend toward the target area].

2. A missile system according to claim 1 further including a plurality of physical communication links, each of said physical communication links for coupling a different one of said missiles to said missile carrier for bidirectional communication of information therebetween while each said missile is being guided during flight from said missile carrier to said assigned target by said guiding means.

3. A missile system according to claim 2 wherein said locating means comprises:

means for repeatedly scanning said target area with radiant energy pulses and for receiving radiant energy returns comprising radiant energy pulses reflected from said target area; and means for processing said radiant energy returns to identify the existence and positions of targets in said target area.

4. A missile system according to claim 3 wherein said scanning means repeatedly azimuthally scans said target area as said missile carrier descends thereto and wherein each said azimuthal scan includes a plurality of radial scans, each of said radial scans comprising a plurality of radar pulses focused on a line connecting the nadir point of said missile carrier to the exterior boundary of said target area.

5. A missile system according to claim 4 further including timing means responsive to the initiation of an azimuthal scan of said target area by said scanning means for determining and storing the elapsed time between the identification of each of said targets in said target area, said processing means for determining the closest spaced subset of said targets by means of said cumulative times generated by said timing means.

6. A missile system according to claim 5 wherein said processing means is coupled to said timing means for accessing said stored elapsed times and for selecting said subset of identified targets having the shortest cumulative elapsed time therebetween for assignment to said missiles.

7. A missile system according to claim 5 further including:

a target memory for storing digital representations of selected targets; and a missile assignment memory for storing a correspondence between said missiles and said identified targets, said processing means for comparing said processed radiant energy returns to said stored target digital representations, and for assigning said missiles to said identified targets based upon said comparisons, and for storing said correspondence in said missile assignment memory in accordance with said assignments.

8. A missile system according to claim 3, wherein the means for repeatedly scanning said target area with radiant energy pulses comprises a drive mechanism configured to:

rotate a radar antenna to perform a complete 360 degree azimuthal sweep; or oscillate the radar antenna through an angle defining a width of a scan pattern.

9. A missile system according to claim 3 further comprising a receiver on each of the plurality of missiles, wherein the receiver is configured to:

sense the radiant energy pulses; and in response to sensing the radiant energy pulses, return a data signal to the missile carrier over one of said physical communication links.

10. A missile system according to claim 1, wherein the missile carrier is selected from the group of carriers consisting of a main missile, a helicopter, and an airplane.

11. A missile system according to claim 1, wherein:

the means for determining the [most closely spaced] subset of said identified targets comprises means for:

scanning the target area azimuthally to determine individually the elapsed time between the scan of each successive target in said target area, and selecting a subset of N identified targets separated by the shortest cumulative elapsed time; and the means for individually assigning said missiles to each of said targets in said subset comprises means for:

determining the missile carried on said missile carrier most nearly opposite target N/2 of said subset of identified targets, assigning said determined opposite missile to the first target in said subset of N selected targets, and assigning successive missiles carried by said missile carrier to azimuthally successive targets of said selected subset of identified targets.

12. A missile system according to claim 1 further comprising an optical sensor in said missile carrier which enables the missile carrier to track the flight of each of said missiles.

13. A method for assigning N missiles carried by a missile carrier to selected ones of M targets ($N \leq M$) located by the missile carrier in a target area, comprising the steps of:

scanning the target area azimuthally to determine individually the elapsed time between the scan of each successive target in said target area;

selecting a subset of N identified targets[separated by the shortest cumulative elapsed time];

determining the missile carried on said missile carrier most nearly opposite target N/2 of said subset of identified targets;

assigning said determined opposite missile to the first target in said subset of N selected targets; and assigning successive missiles carried by said missile carrier to azimuthally successive targets of said selected subset of identified targets.

14. The method of claim 13, wherein the missile carrier is selected from the group of carriers consisting of a main missile, a helicopter, and an airplane.

15. The method of claim 13 further comprising:

launching said missiles against said assigned targets; and responsive to said launching of said missiles, guiding said launched missiles substantially through the entire flights thereof from said missile carrier to said assigned targets.

16. The method of claim 15 further comprising:

coupling said missiles to said missile carrier by a plurality of physical communication links for bidirectional communications of information therebetween while each said missile is being guided during flight from said missile carrier to said assigned target.

17. The method of claim 15 further comprising using optical frequencies to enable the missile carrier to track the flight of each of said missiles.

18. The method of claim 13, wherein scanning the target area comprises:

repeatedly scanning said target area with radiant energy pulses and receiving radiant energy returns comprising radiant energy pulses reflected from said target area; and processing said radiant energy returns to identify the existence and positions of the targets in said target area.

19. The method of claim 18, wherein repeatedly scanning said target area comprises:

repeatedly azimuthally scanning said target area, wherein each azimuthal scan includes a plurality of radial scans, each of said radial scans comprising a plurality of radar pulses focused on a line connecting a nadir point of said missile carrier to an exterior boundary of said target area.

20. The method of claim 18, wherein repeatedly scanning said target area comprises:

rotating a radar antenna to perform a complete 360 degree azimuthal sweep; or oscillating the radar antenna through an angle defining a width of a scan pattern.

21. The method of claim 18 further comprising:

sensing the radiant energy pulses by a one of said missiles; and in response to sensing the radiant energy pulses, returning a data signal to the missile carrier over a communication link.

22. A missile system comprising:

a missile carrier deliverable to a position overlying a target area;

a plurality of missiles carried by said missile carrier, said missile carrier including:

a radar unit configured to:

locate targets within the target area as said missile carrier descends toward the target area;

determine [the most closely spaced] *a* subset of said identified targets equal in number to the plurality of missiles carried by said missile carrier;

individually assign said missiles to each of said targets in said subset in a manner to [minimize] *reduce* the likelihood of the trajectories of said missiles interfering with each other; and responsive to launching of said missiles, guide said launched missiles substantially through the entire flights thereof from said missile carrier to said assigned targets[as the missile carrier continues to descend toward the target area]; and a submissile launcher configured to launch said missiles against said assigned targets.

23. A missile system according to claim 22 further including a plurality of physical communication links, each of said physical communication links for coupling a different one of said missiles to said missile carrier for bidirectional communication of information therebetween while each said missile is being guided during flight from said missile carrier to said assigned target by said radar unit.

24. A missile system according to claim 23 wherein said radar unit is configured to:

repeatedly scan said target area with radiant energy pulses and receive radiant energy returns comprising radiant energy pulses reflected from said target area; and process said radiant energy returns to identify the existence and positions of targets in said target area.

25. A missile system according to claim 24 wherein said radar unit is configured to repeatedly azimuthally scan said target area as said missile carrier descends thereto and wherein each said azimuthal scan includes a plurality of radial scans, each of said radial scans comprising a plurality of radar pulses focused on a line connecting the nadir point of said missile carrier to the exterior boundary of said target area.

26. A missile system according to claim 24 further including:

a target memory for storing digital representations of selected targets; and a missile assignment memory for storing a correspondence between said missiles and said identified targets, said radar unit configured to compare said processed radiant energy returns to said stored target digital representations, to assign said missiles to said identified targets based upon said comparisons, and to store said correspondence in said missile assignment memory in accordance with said assignments.

27. A missile system according to claim 24 further comprising a receiver on each of the plurality of missiles, wherein the receiver is configured to:

sense the radiant energy pulses; and in response to sensing the radiant energy pulses, return a data signal to the missile carrier over one of said physical communication links.

28. A missile system according to claim 22, wherein the missile carrier is selected from the group of carriers consisting of a main missile, a helicopter, and an airplane.

29. A missile system according to claim 22, wherein the radar unit is configured to:

scan the target area azimuthally to determine individually the elapsed time between the scan of each successive target in said target area;

select a subset of N identified targets separated by the shortest cumulative elapsed time;

determine the missile carried on said missile carrier most nearly opposite target N/2 of said subset of identified targets;

assign said determined opposite missile to the first target in said subset of N selected targets, and assign successive missiles carried by said missile carrier to azimuthally successive targets of said selected subset of identified targets.

30. A missile system according to claim 22, wherein the radar unit comprises a drive mechanism configured to:

rotate a radar antenna to perform a complete 360 degree azimuthal sweep; or oscillate the radar antenna through an angle defining a width of a scan pattern.

31. A missile system according to claim 22 further comprising an optical sensor in said missile carrier which enables the missile carrier to track the flight of each of said missiles.

*32. A missile system according to claim 1 further comprising a plurality of hardwired communication links, coupling said missiles to said missile carrier for communication of information.*

*33. A missile system according to claim 32 wherein said missiles are assigned to each of said targets in said subset to reduce the likelihood of entanglement.*

*34. A missile system according to claim 32 wherein the hardwired communication links comprise at least one of: wires; or reinforced optical fibers.*

*35. A missile system according to claim 1 wherein the missile carrier is a main missile comprising a booster rocket.*

*36. A missile system according to claim 35 further comprising a guidance control section.*

*37. A missile system according to claim 35 further comprising a drag parachute or drag brake to decelerate the missile carrier during descent after the booster rocket has been jettisoned.*

*38. A missile system according to claim 1 wherein the plurality of missiles carried by said missile carrier comprise pulsing lights or lasers with characteristic frequencies uniquely identifying each of the missiles.*

*39. A method according to claim 13 further comprising coupling said missiles to said missile carrier by a plurality of hardwired communication links for communication of information.*

*40. A method according to claim 39 wherein said missiles are assigned to each of said targets in said subset to reduce the likelihood of entanglement.*

*41. A method according to claim 39 wherein the hardwired communication links comprise at least one of: wires; or reinforced optical fibers.*

*42. A method according to claim 13 wherein the missile carrier is a main missile comprising a booster rocket.*

*43. A method according to claim 42 wherein the missile carrier further comprises a guidance control section.*

*44. A method according to claim 42 wherein the missile carrier further comprises a drag parachute or drag brake to decelerate the missile carrier during descent after the booster rocket has been jettisoned.*

*45. A method according to claim 13 wherein the N missiles carried by said missile carrier comprise pulsing lights or lasers with characteristic frequencies uniquely identifying each of the missiles.*

*46. A missile system according to claim 22 further comprising a plurality of hardwired communication links, coupling said missiles to said missile carrier for communication of information.*

*47. A missile system according to claim 46 wherein said missiles are assigned to each of said targets in said subset to reduce the likelihood of entanglement.*

*48. A missile system according to claim 46 wherein the hardwired communication links comprise at least one of: wires; or reinforced optical fibers.*

*49. A missile system according to claim 22 wherein the missile carrier is a main missile comprising a booster rocket.*

*50. A missile system according to claim 49 further comprising a guidance control section.*

*51. A missile system according to claim 49 further comprising a drag parachute or drag brake to decelerate the missile carrier during descent after the booster rocket has been jettisoned.*

*52. A missile system according to claim 22 wherein the plurality of missiles carried by said missile carrier comprise pulsing lights or lasers with characteristic frequencies uniquely identifying each of the missiles.*

* * * * *